US008509360B2

(12) United States Patent
Fujita et al.

(10) Patent No.: US 8,509,360 B2
(45) Date of Patent: Aug. 13, 2013

(54) PULSE RADIO RECEIVER

(75) Inventors: Suguru Fujita, Tokyo (JP); Masahiro Mimura, Tokyo (JP); Kazuaki Takahashi, Tokyo (JP); Takenori Sakamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 1076 days.

(21) Appl. No.: 12/281,883

(22) PCT Filed: Mar. 1, 2007

(86) PCT No.: PCT/JP2007/053932
§ 371 (c)(1),
(2), (4) Date: Sep. 5, 2008

(87) PCT Pub. No.: WO2007/102398
PCT Pub. Date: Sep. 13, 2007

(65) Prior Publication Data
US 2009/0074117 A1    Mar. 19, 2009

(30) Foreign Application Priority Data

Mar. 6, 2006  (JP) ................. 2006-059151
Feb. 27, 2007 (JP) ................. 2007-048017

(51) Int. Cl.
*H04L 7/00* (2006.01)
(52) U.S. Cl.
USPC ........................................ 375/343
(58) Field of Classification Search
USPC ............... 375/343, 130, 148, 320, 340, 354, 375/371; 455/323, 12.1, 502; 327/158, 276; 329/319; 714/819
See application file for complete search history.

(56) References Cited

U.S. PATENT DOCUMENTS

| 2004/0208236 A1 | 10/2004 | Fenton |
| 2005/0013392 A1* | 1/2005 | Mizugaki et al. ............ 375/343 |
| 2005/0090274 A1 | 4/2005 | Miyashita |
| 2006/0068745 A1* | 3/2006 | Wei ............................ 455/323 |

FOREIGN PATENT DOCUMENTS

| JP | 2000-078211 | 3/2000 |
| JP | 2004-241927 | 8/2004 |
| JP | 2005-130295 | 5/2005 |
| WO | 2004/009339 | 10/2004 |

OTHER PUBLICATIONS

International Search Report dated Apr. 17, 2007.

* cited by examiner

*Primary Examiner* — Sam K Ahn
*Assistant Examiner* — Shawkat M Ali
(74) *Attorney, Agent, or Firm* — Dickinson Wright PLLC

(57) ABSTRACT

A pulse radio receiving apparatus includes a reference waveform generation section that generates a reference waveform signal, a delay section that generates a plurality of delayed waveform signals by delaying the reference waveform signal by different amounts of delay, a correlation calculation section that generates a plurality of correlation value signals showing correlation values between a received signal, and the reference waveform signal and the delayed waveform signals, a determination section that compares predetermined combinations of the plurality of correlation value signals and generates a difference detection signal showing a direction and degree of a phase shift between the received signal and the reference waveform signal according to comparison results, and a synchronization control section that controls a phase of the reference waveform signal generated by the reference waveform signal generation section based on the difference detection signal.

20 Claims, 24 Drawing Sheets

PULSE RADIO RECEIVER

TECHNICAL FIELD

The present invention relates to a pulse radio receiving apparatus that receives pulse modulated signals.

BACKGROUND ART

Wireless communication techniques using an impulse communication scheme represented by UWB (Ultra Wide Band) do not necessarily require linearity for the transmitting/receiving circuit elements, and so is suitable for the CMOS (Complementary Metal Oxide Semiconductor) and can be miniaturized. Wireless communication techniques do not require RF circuits such as precise local signal sources and consumes low power, and, furthermore, has an advantage of enabling high speed communication utilizing a wide band.

For a conventional method for synchronizing received pulse signals in a pulse radio receiving apparatus, a method of tracking synchronization based on correlation between the reference time and signals that are subjected to delay processing and that are arrive before and after the reference time is known (see, for example, Patent Document 1). The conventional technique will be described below with reference to the accompanying drawings.

FIG. 1 is a block diagram showing the configuration of the conventional pulse radio receiving apparatus disclosed in Patent Document 1. Referring to FIG. 1, conventional pulse radio receiving apparatus 10 detects received signal 21 in ASK (Amplitude Shift Keying) detector 11. Next, amplifier 12 amplifies both the direct current component and the alternating current component of the signal, and A/D converter 13 converts the analogue signal to a digital signal and generates digital signal 22. DSP 14 finds the maximum values and minimum values of this digital signal 22 in a predetermined period and moving averages of these values, and tracks the synchronization timing as follows.

First, extreme value detection section 15 detects the minimum values and maximum values of inputted digital signal 22 in a plurality of predetermined periods, and outputs these values to moving average section 16. Then, moving average section 16 finds averages of a plurality of maximum values and averages of a plurality of minimum values in a plurality of predetermined periods and outputs these averages to average section 17. Further, average section 17 finds an average of the maximum values and an average of minimum values inputted from moving average section 16 and further finds an average of moving average values of these averages, and outputs this average to binarization operation section 18. Furthermore, binarization operation section 18 binarizes digital signal 22 inputted from A/D converter 13 using the value inputted from average section as the threshold. This binarized data is outputted to signal processing circuit 19 as NRZ (Non Return to Zero) data sequence 23.
Patent Document 1: Japanese Patent Application Laid-Open No. 2000-78211 (page 17 and FIG. 3)

DISCLOSURE OF INVENTION

Problems to be Solved by the Invention

Upon synchronized reception of pulse modulated signals, the above conventional pulse radio receiving apparatus requires a period in advance to set the threshold using the training symbol and requires time to establish synchronization. Further, there is a problem that, if the ratio of the received signal to noise (S/N ratio: Signal to Noise ratio) varies, threshold control according to the intensity of the received signal and amplitude control by an automatic gain control apparatus (AGC: Automatic Gain Control) are required.

It is therefore an object of the present invention to provide a pulse radio receiving apparatus that, upon synchronization of a received signal, enables synchronized reception without setting a threshold for a baseband signal, that, even when the S/N ratio varies after reception is synchronized, makes it unnecessary to reset the threshold by an adaptive control mechanism, and that, consequently, reduces the time required to establish synchronization.

Means for Solving the Problem

To solve the above problems, the one embodiment of the pulse radio receiving apparatus according to the present invention employs a configuration including: a reference waveform generation section that generates a reference waveform signal; a delay section that generates a plurality of delayed waveform signals by delaying the reference waveform signal by different amounts of delay; a correlation calculation section that generates a plurality of correlation value signals showing correlation values between a received signal, and the reference waveform signal and the delayed waveform signals; a determination section that compares predetermined combinations of the plurality of correlation value signals and generates a difference detection signal showing a direction and degree of a phase shift between the received signal and the reference waveform signal according to comparison results; and a synchronization control section that controls a phase of the reference waveform signal generated by the reference waveform signal generation section based on the difference detection signal.

According to this configuration, a plurality of correlation values between a received signal and reference waveform signals of different phases are generated and relative scales between combinations of these correlation values are compared, and, consequently, the direction and degree of phase adjustment for synchronization can be determined, so that, even when the S/N ratio of the received signal varies, the threshold needs not to be adjusted and set based on the variation of the reception level of the received signal, the training period required to set an optimum threshold is made unnecessary and the time required to acquire synchronization is reduced.

One embodiment of the pulse radio receiving apparatus according to the present invention employs a configuration including: a reference waveform generation section that generates a reference waveform signal; a delay section that generates a plurality of delayed waveform signals by delaying a received signal by different amounts of delay; a correlation calculation section generates a plurality of correlation value signals showing correlation values between the reference waveform signal and the plurality of delayed waveform signals delayed in the delay section; a determination section that compares predetermined combinations of the plurality of correlation value signals and generates a difference detection signal showing a direction and degree of a phase shift between the received signal and the reference waveform signal according to comparison results; and a synchronization control section that controls a phase of the reference waveform signal generated by the reference waveform generation section based on the difference detection signal.

According to this configuration, a plurality of correlation values between the received signal and the reference waveform signals of different phases are generated and relative scales between combinations of these correlation values are compared, and, consequently, the direction and degree of phase adjustment for synchronization can be determined, so that, even when the S/N ratio of the received signal varies, the threshold needs not to be adjusted and set based on the variation of the reception level of the received signal, the training period required to set an optimum threshold is made unnecessary and the time required to acquire synchronization is reduced. Further, correlation value signals can be generated by applying clock signals to branched input ends, so that, even when significant noise is included in the received signal, it is possible to determine the direction and degree of phase adjustment more accurately.

One embodiment of the pulse radio receiving apparatus according to the present invention employs a configuration where the delay section sets a greatest amount of delay for the delayed waveform signals less than a symbol length of the received signal.

According to this configuration, when synchronization of an envelope signal obtained by detecting the envelope of the received signal is established, a plurality of correlation value signals can be obtained within a range of the symbol length where peaks of the envelope signal are caught, so that it is possible to determine the direction and degree of phase adjustment for maintaining synchronization.

One embodiment of the pulse radio receiving apparatus according to the present invention employs a configuration where the delay section sets a delay interval between the delayed waveform signals equal to or less than half the symbol length of the received signal.

According to this configuration, when synchronization of an envelope signal obtained by detecting the envelope of the received signal is established, at least three correlation value signals can be obtained within a range of half the symbol length where peaks of the envelope signal are caught, so that, when the envelope of the received signal is detected, it is possible to determine the direction more accurately and degree of phase adjustment for maintaining synchronization.

One embodiment of the pulse radio receiving apparatus according to the present invention employs a configuration where the delay section generates at least three of the delayed waveform signals and sets the greatest amount of delay for the delayed waveform signals equal to or less than half the symbol length of the received signal.

According to this configuration, when synchronization of an envelope signal obtained by detecting the envelope of the received signal is established, at least four correlation value signals can be obtained within a range of half the symbol length where peaks of the envelope signal are caught, so that, when the envelope of the received signal is detected, it is possible to determine the direction and degree of phase adjustment for maintaining synchronization more accurately.

One embodiment of the pulse radio receiving apparatus according to the present invention employs a configuration where the delay section sets the greatest amount of delay for the delayed waveform signals equal to or less than a cycle of a carrier frequency of the received signal.

According to this configuration, when synchronization of the received signal is established, a plurality of correlation value signals can be obtained within a range of the cycle of the carrier frequency where peaks of a coherent signal are caught, so that it is possible to determine the direction and degree of phase adjustment for maintaining synchronization.

One embodiment of the pulse radio receiving apparatus according to the present invention employs a configuration where the delay section sets a delay interval between the delayed waveform signals equal to or less than half the cycle of the carrier frequency of the received signal.

According to this configuration, when synchronization of the received signal is established, at least three correlation value signals can be obtained within a range of half a cycle of the carrier frequency where peaks of the coherent signal are caught, so that it is possible to determine the direction and degree of phase adjustment for maintaining synchronization more accurately.

One embodiment of the pulse radio receiving apparatus according to the present invention employs a configuration where the delay section generates at least three of the delayed waveform signals and sets the greatest amount of delay for the delayed waveform signals equal to or less than half the cycle of the carrier frequency of the received signal.

According to this configuration, when synchronization of the received signal is established, at least four correlation value signals can be obtained within a range of half the cycle of the carrier frequency where peaks of the coherent signal are caught, so that it is possible to determine the direction and degree of phase adjustment for maintaining synchronization more accurately.

One embodiment of the pulse radio receiving apparatus according to the present invention employs a configuration where the determination section includes at least one combination of the correlation value signals which are not adjacent in the time domain in the predetermined combinations of the correlation values.

According to this configuration, to determine the direction and degree of phase adjustment, at least one combination of correlation values that are apart in the time domain, so that it is possible to reduce erroneous detection of the direction of phase adjustment.

One embodiment of the pulse radio receiving apparatus according to the present invention employs a configuration where the determination section suitably changes the predetermined combinations of the correlation values.

According to this configuration, when, for example, the symbol length or the cycle of the carrier frequency varies, optimum combinations can be used according to the symbol length or the cycle of the carrier frequency, so that it is possible to determine the direction and degree of phase adjustment accurately.

One embodiment of the pulse radio receiving apparatus according to the present invention employs a configuration further including a demodulation section that demodulates signal data from the received signal using the reference waveform signal as a timing signal.

According to this configuration, the timing signal required to demodulate the received signal can be generated from the reference waveform signal used to maintain synchronization, which makes it unnecessary to generate an additional timing signal, which can simplify processing required to generate the timing signal and which enables demodulation using the timing signal synchronized with the received signal, so that it is possible to improve demodulation accuracy.

One embodiment of the pulse radio receiving apparatus according to the present invention employs a configuration where the demodulation section demodulates the correlation value signal showing a correlation value between the received signal and the reference waveform signal.

According to this configuration, demodulation processing is carried out in a state where synchronization is maintained, so that it is possible to improve demodulation accuracy.

One embodiment of the pulse radio receiving apparatus according to the present invention employs a configuration further including a detector that detects an envelope of the received signal, and employs a configuration where: the correlation value calculation section generates a plurality of correlation value signals showing correlation values between the received signal subjected to envelope detection by the detector and the reference waveform signal and the delayed waveform signals; the determination section generates a difference detection signal showing a direction and degree of a phase shift between the received signal subjected to envelope detection by the detector and the reference waveform signal; and the demodulation section demodulates the received signal subjected to envelope detection by the detector.

According to this configuration, an envelope signal obtained by detecting the envelope of the received signal is used for demodulation. Consequently, when the received signal is an on-off keying modulated signal, arithmetic operation processing required for determination processing and demodulation processing is reduced and the time required to acquire synchronization can be made short compared to the case where demodulation is carried out utilizing the carrier phase.

One embodiment of the pulse radio receiving apparatus according to the present invention employs a configuration where, for combinations of the correlation values, the determination section: uses, for a first combination, a first correlation value calculated using the reference waveform signal and a third correlation value calculated using one of the plurality of delayed waveform signals other than a signal with a greatest amount of delay in the delayed waveform signals; uses, for a second combination, a second correlation value calculated using the delayed waveform signal with the greatest amount of delay and a fourth correlation value calculated using one delayed waveform signal other than a signal with a greatest amount of delay in the plurality of delayed waveform signals; and generates the difference detection signal based on a relative scale between a first evaluation value obtained by subtracting the first correlation value from the third correlation value in the first combination and a second evaluation value obtained by subtracting the second correlation value from the fourth correlation value.

According to this configuration, four correlation value signals are used, and, in the four correlation value signals, correlation value signals which are the farthest apart from one another in the time domain belong to different combinations, and so combining the correlation values which are the farthest apart from one another in the time domain, can be avoided, and combining correlation value signals other than the correlation value signals which are the farthest apart from one another in the time domain, can be avoided, so that it is possible to determine the direction of phase adjustment based on the relative scales between combinations of correlation values correctly.

One embodiment of the pulse radio receiving apparatus according to the present invention employs a configuration where the third correlation value and the fourth correlation value are calculated using the delayed waveform signal with half an amount of delay for the delayed waveform signal with the greatest amount of delay.

According to this configuration, the direction and method of phase adjustment can be determined using three correlation value signals, so that it is possible to simplify the configuration and reduce consumption power.

One embodiment of the pulse radio receiving apparatus according to the present invention employs a configuration where: the third correlation value is calculated using the delayed waveform signal with an amount of delay which is equal to or greater than and closest to half the amount of delay for the delayed waveform signal with the greatest amount of delay; and the fourth correlation value is calculated using the delayed waveform signal with an amount of delay which is equal to or less than and closest to half the amount of delay for the delayed waveform signal of the greatest amount of delay.

According to this configuration, the correlation value signals are combined to cross with each other in the time domain, so that, even if the number of correlation value signals is an even number, it is possible to determine the direction of phase adjustment in a reliable manner.

One embodiment of the pulse radio receiving apparatus according to the present invention employs a configuration where, for combinations of the correlation values, the determination section: uses, for a third combination, a first correlation value calculated using the reference waveform signal and a third correlation value calculated using one of the plurality of delayed waveform signals other than a signal with a greatest amount of delay in the delayed waveform signals; uses, for a fourth combination, a second correlation value calculated using the delayed waveform signal with the greatest amount of delay and a fourth correlation value calculated using one of the plurality of delayed waveform signals other than a signal with a greatest amount of delay in the delayed waveform signals; uses, for a fifth combination, the first correlation value and a fifth correlation value calculated using one delayed waveform signal which is other than a signal with the greatest amount of delay in the plurality of delayed waveform signals and which is different from the delayed waveform signal used to calculate the third correlation value or the fourth correlation value; uses, for a sixth combination, the second correlation value and the fifth correlation value; calculates a third evaluation value by subtracting a value obtained by subtracting the first correlation value from the third correlation value in the third combination, from a value obtained by subtracting the second correlation value from the fifth correlation value in the sixth combination; calculates a fourth evaluation value by subtracting a value obtained by subtracting the second correlation value from the fourth correlation value in the fourth combination, from a value obtained by subtracting the first correlation value from the fifth correlation value in the fifth combination; and further generates the difference detection signal based on a relative scale between the third evaluation value and the fourth evaluation value.

According to this configuration, five correlation value signals are used and, in the five correlation value signals, correlation value signals which are the farthest apart from one another in the time domain belong to different combinations, and so combining the correlation values which are the farthest apart from one another in the time domain, can be avoided, and combining correlation value signals other than the correlation value signals which are the farthest apart from one another in the time domain, can be avoided, so that it is possible to determine the direction of phase adjustment based on the relative scales between combinations of correlation values.

One embodiment of the pulse radio receiving apparatus according to the present invention employs a configuration where: the third correlation value is calculated using the delayed waveform signal with an amount of delay which is equal to or greater than and closest to half the amount of delay for the delayed waveform signal with the greatest amount of delay; the fourth correlation value is calculated using the delayed waveform signal with an amount of delay which is equal to or less than and closest to half the amount of delay for the delayed waveform signal with the greatest amount of delay; and the fifth correlation value is calculated using the delayed waveform signal with half an amount of delay for the delayed waveform signal with the greatest amount of delay.

According to this configuration, the correlation value signals are combined to cross with each other in the time domain and a difference detection signal is generated using the correlation value signal closest to the maximum correlation value upon acquiring synchronization, so that, even if the number of correlation value signals is an odd number, it is possible to accurately determine the direction of phase adjustment.

One embodiment of the pulse radio receiving apparatus according to the present invention employs a configuration where the determination section equalizes each of the plurality of correlation value signals and adds and combines the equalized correlation value signals in the predetermined combinations to generate the difference detection signal.

According to this configuration, the operating frequency of the circuit for determination processing can be decreased, so that it is possible to determine the direction and degree of phase adjustment with a simple configuration.

One embodiment of the pulse radio receiving apparatus according to the present invention employs a configuration where the determination section samples and holds a maximum value of the correlation value signals in each clock cycle and further carries out discharge processing on the maximum value of the correlation value signals at a clock timing to equalize each of the plurality of correlation value signals.

According to this configuration, it is possible to output the maximum value in the unit time interval accurately and determine the amount of phase adjustment more accurately.

One embodiment of the pulse radio receiving apparatus according to the present invention employs a configuration where the determination section generates a plurality of combined signals by combining the correlation value signals in the predetermined combinations, equalizes each of the combined signals and generates a difference detection signal by adding and combining the equalized combined signals.

According to this configuration, the pulse radio receiving apparatus can be configured with fewer integration circuits and therefore can be implemented in a simpler configuration.

One embodiment of the pulse radio receiving apparatus according to the present invention employs a configuration where: the determination section generates the combined signals by combining the correlation value signals generated by the correlation calculation section, and generates a demodulation target signal by adding or mixing the combined signals generated by the determination section; a delay section generates a timing signal by delaying the reference waveform signal by a same amount of delay as an amount of delay between the reference waveform signal and the demodulation target signal; and the pulse radio receiving apparatus further comprises a demodulation section that demodulates signal data from the demodulation target signal and the timing signal.

According to this configuration, a signal from which an unnecessary signal, which is not correlated with the reference waveform signal, is removed, can be generated as a demodulation target signal, so that it is possible to carry out demodulation processing with fewer errors.

One embodiment of the pulse radio receiving apparatus according to the present invention employs a configuration where: the determination section further generates a pulse correlation detection signal showing whether or not the received signal is caught, based on a relative scale between combinations of the correlation values shown by the correlation value signals; and the synchronization control section controls a phase of the reference waveform signal according to the pulse correlation detection signal and the difference detection signal.

According to this configuration, it is possible to determine whether or not the difference detection signal is useful at the same time, suitably control the phase of the reference waveform signal according to the synchronization state and determine the direction of phase adjustment more correctly.

Advantageous Effect of the Invention

The pulse radio receiving apparatus according to the present invention makes unnecessary the period for setting the threshold using the training symbol, makes it unnecessary to reset the threshold by the mechanism even when the S/N ratio varies after reception is synchronized, and, consequently, reduces the time required to acquire accurate synchronization.

BEST MODE FOR CARRYING OUT THE INVENTION

Embodiments of the present invention will be described below with reference to the accompanying drawings.

Embodiment 1

The pulse radio receiving apparatus according to the present embodiment makes relative comparisons of correlation values between a received signal and a plurality of reference signals of different phases, correctly determines the direction and degree of phase adjustment for synchronization, and, consequently, reduces the time required to establish synchronization.

Figure 1:
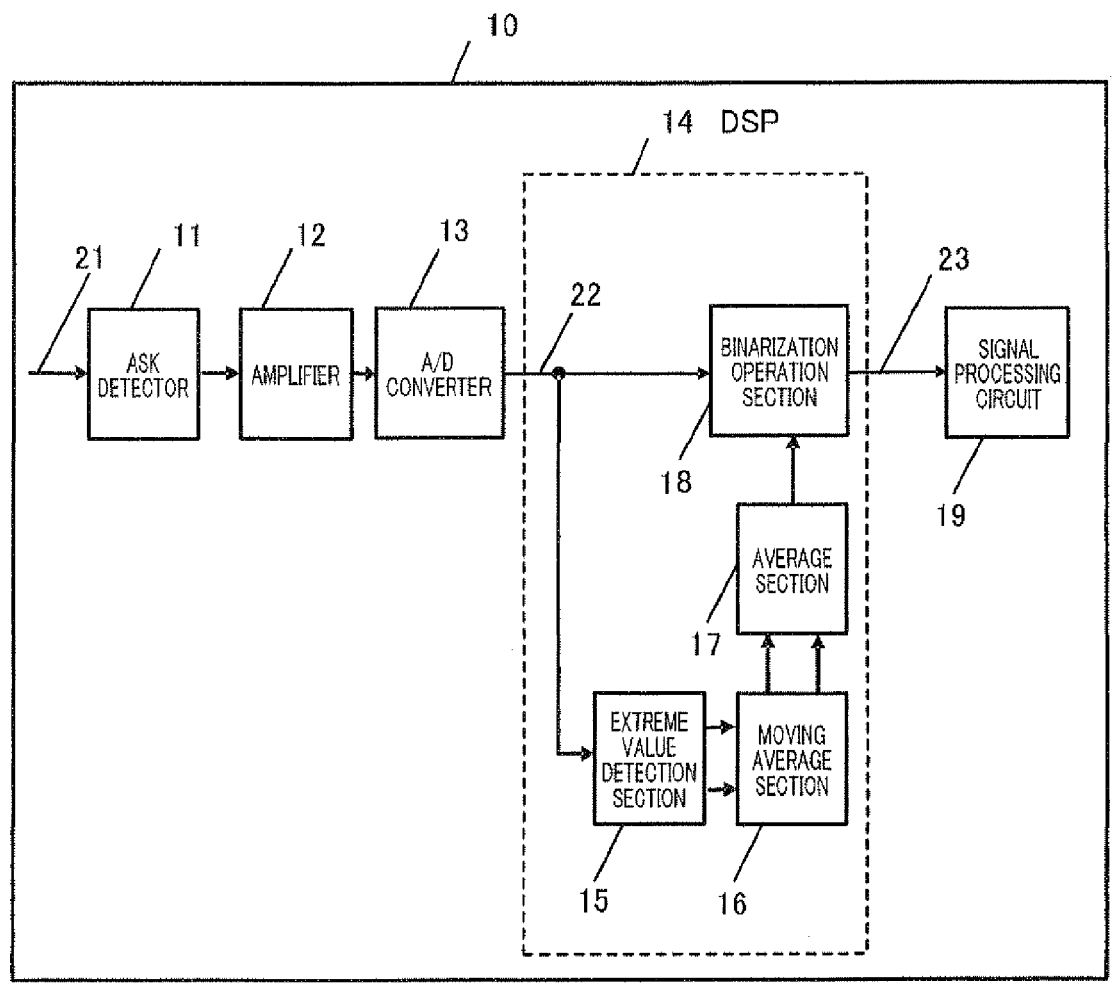
FIG. 1 shows a configuration of a conventional pulse radio receiving apparatus.
Figure 2:
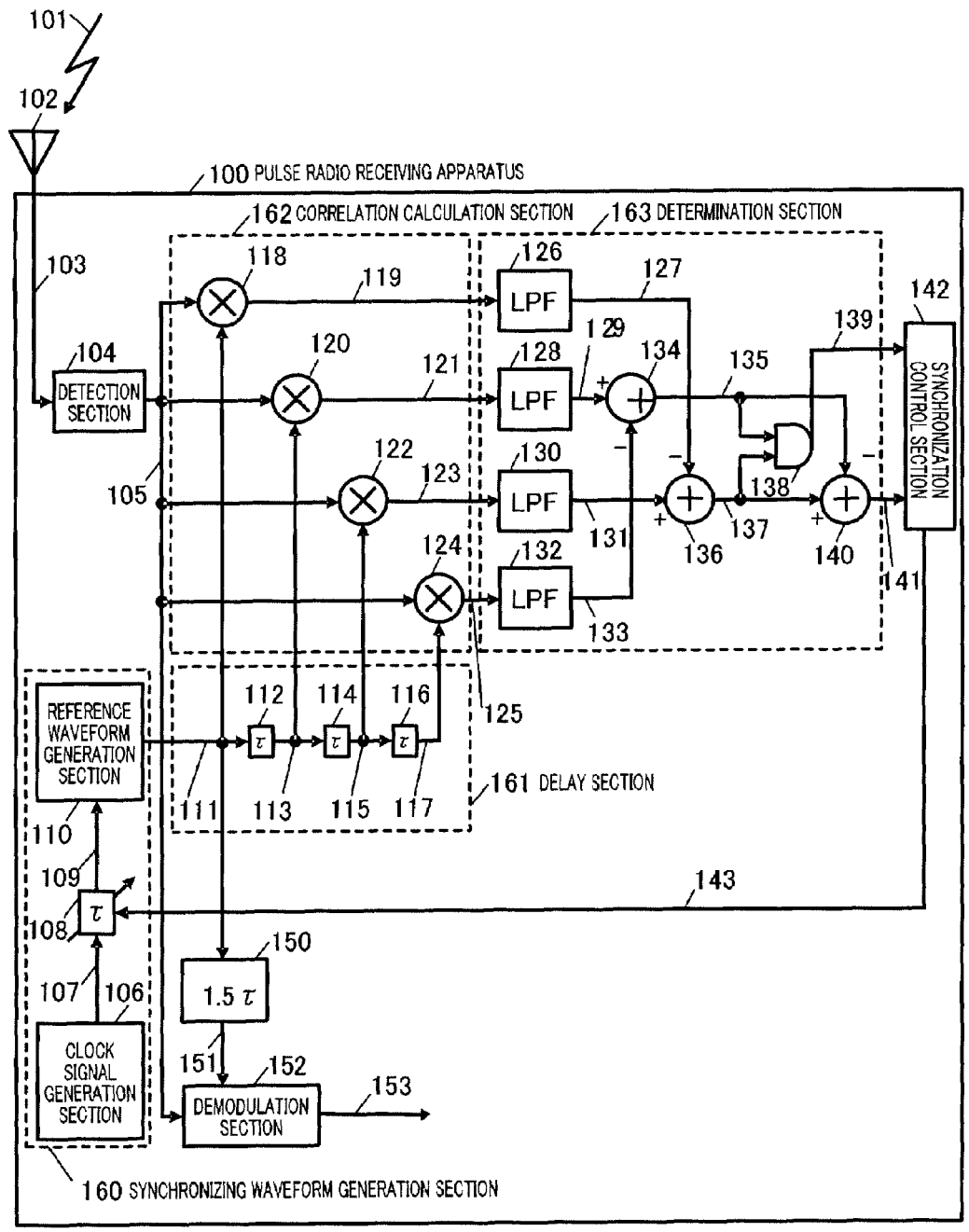
FIG. 2 shows a configuration of a pulse radio receiving apparatus according to Embodiment 1 of the present invention.

FIG. 2 shows a configuration of the pulse radio receiving apparatus according to Embodiment 1 of the present invention.

In FIG. 2, pulse radio receiving apparatus 100 is formed with detection section 104, synchronizing waveform generation section 160, delay section 161, correlation calculation section 162, determination section 163 and synchronization control section 142, and is connected with receiving antenna 102. Further, above pulse radio receiving apparatus 100 has demodulation section 152 that demodulates signal data 153 from detected signal 105 and reference signal waveform signal 111.

(Detection Section)

Figure 3A:
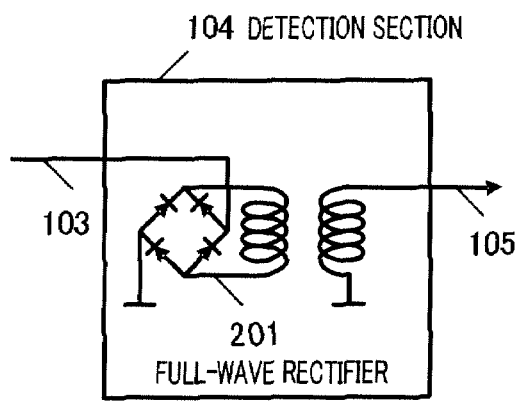
FIG. 3 shows a configuration of a detection section according to Embodiment 1.

Detection section 104 detects the envelope of received signal 103 by full-wave rectification and outputs detected signal 105. FIG. 3A shows the configuration of the detection section according to the present embodiment. In FIG. 3A, detection section 104 is implemented by full-wave rectifier 201. Received signal 103 has generally an impulse waveform with positive and negative amplitudes. Detection section 104 is provided in a preceding stage of the first to fourth mixers, to prevent positive and negative amplitudes from canceling each other and to effectively detect the correlation with reference waveform signal 111.

Figure 3B:
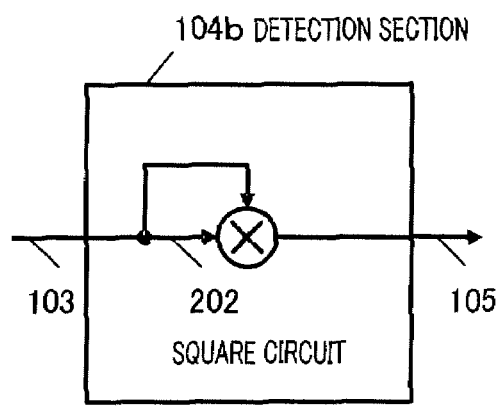
Figure 4:
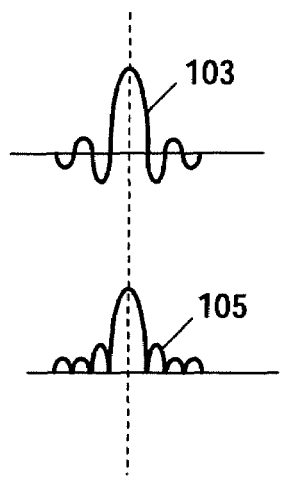
FIG. 4 illustrates an operation of the detection section according to Embodiment 1.

FIG. 4 illustrates the operation of the detection section according to the present embodiment. In FIG. 4, received signal 103 has an impulse waveform with positive and negative values. The envelope of this received signal 103 is detected by detection section 104 and shaped into detected signal 105 of a waveform with no negative value. Further, although full-wave rectifier 201 is employed with the present embodiment, another circuit configuration is possible. FIG. 3B shows another configuration of the detection section according to the present embodiment. In FIG. 3B, detection section 104b generates detected signal 105 by square circuit 202. Further, if received signal 103 is an impulse waveform with no negative value, the same effect can be obtained by configuring detection section 104 to output received 103 signal as is as detected signal 105.

(Synchronizing Waveform Generation Section)

Figure 5:
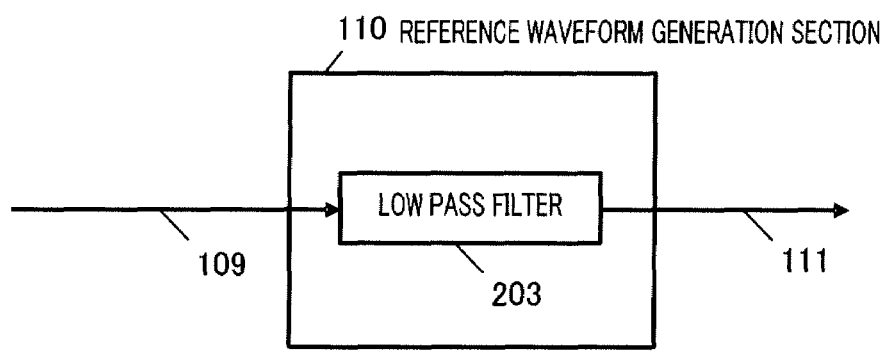
FIG. 5 shows a configuration of a reference waveform generation section according to Embodiment 1.

Synchronizing waveform generation section 160 has clock signal generation section 106, variable signal delay section 108 and reference waveform generation section 110, and is configured to delay clock signal 107 generated by clock signal generation section 106, by a predetermined time in variable signal delay section 108, shape the waveform of clock signal 107 in reference waveform generation section 110 and generate reference waveform signal 111 at the pulse timing of synchronization timing signal 109. FIG. 5 shows a configuration of the reference waveform generation section according to the present embodiment. In FIG. 5, reference waveform generation section 110 is configured using low pass filter (LPF) 203 in the internal configuration. Further, with the present embodiment, the waveform of reference waveform signal 111 is similar to the waveform of detected signal 105 in the marks in on-off keying (hereinafter, a "mark" refers to the "on state" in on-off keying). Further, the delay time in variable signal delay section 108 can be adjusted by control signal 143 outputted by synchronization control section 142 (described later).

(Delay Section)

Delay section 161 has first delay element 112, second delay element 114 and third delay element 116 and is configured to output the signal inputted as the original waveform signal and the signals obtained by giving delays to the original waveform signal in steps. In FIG. 2, delay section 161 outputs reference waveform signal 111 and waveform signals 113, 115 and 117 obtained by delaying reference waveform signal 111 by time τ in first to third delay elements 112, 114 and 116 each. Further, although, with the present embodiment, first to third delay elements 112, 114 and 116 are configured to each delay input signals by time τ, the input signals may be replaced by the received signal, depending on the waveform of the received signal. Further, with the present embodiment, delay time τ will be described as a value smaller than half of the half-maximum pulse width of detected signal 105. Further, this half-maximum pulse width refers to the duration of the period where detected signal 105 shows positive values in FIG. 4, and is equivalent to the symbol length of received signal 103. Further, as in the case of the PPM modulation scheme, if the half-maximum pulse width is not equivalent to the symbol length, delay time τ is smaller than half of the half-maximum pulse width equivalent to the pulse width.

Correlation calculation section 162 has first mixer 118, second mixer 120, third mixer 122 and fourth mixer 124, and mixes and outputs signals each inputted from a pair of signal sequences. In FIG. 2, correlation calculation section 162 mixes detected signal 105, reference waveform signal 111 and delayed waveform signals 113, 115, and 117 obtained by delaying reference waveform signal 111 by time τ in first to fourth mixers 118, 120, 122 and 124 each, and outputs first to fourth correlation value signals 119, 121, 123 and 125.

(Determination Section)

Determination section 163 is formed with first integration section 126, second integration section 128, third integration section 130, fourth integration section 132, first signal addition section 134, second signal addition section 136 and third signal addition section 140.

In FIG. 2, determination section 163 outputs signals 127, 129, 131 and 133, obtained by equalizing first to fourth correlation value signals 119, 121, 123 and 125 outputted by correlation calculation section 162 in first to fourth integration sections 126, 128, 130 and 132. Next, determination section 163 adds signal 129 and the signal inverting signal 133 in first signal addition section 134, and generates signal 135. Further, determination section 163 adds signal 131 and the signal inverting signal 127 in second signal addition section 136, and generates signal 137. Further, determination section 163 adds signal 137 and the signal inverting signal 135 in third signal addition section 140, and generates difference detection signal 141.

Figure 6A:
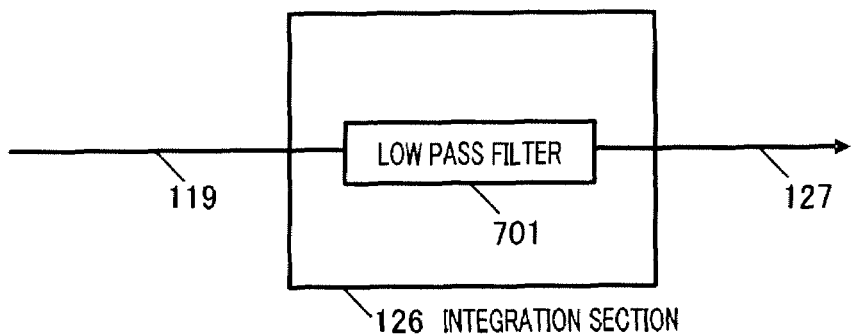
FIG. 6 shows a configuration of an integration section according to Embodiment 1.

Further, FIG. 6A shows a configuration of the integration section in the determination section according to the present embodiment. In FIG. 6A, integration section 126 has low pass filter 701 and equalizes inputted correlation value signal 119. Further, with the present embodiment, integration sections 128, 130 and 132 also have the same configuration.

Figure 6B:
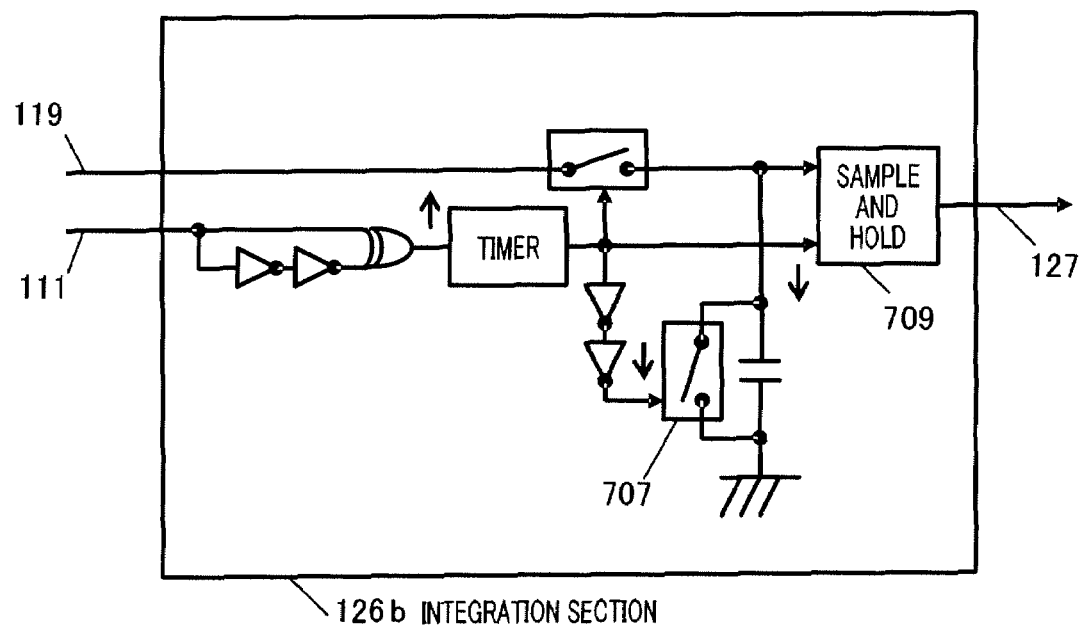

Further, FIG. 6B shows another configuration of the integration section in the determination section according to the present embodiment. In FIG. 6B, integration section 126b is configured to have integrator 707 with a discharge circuit, and is able to operate precisely in synchronization with the clock. That is, this integration section 126b is able to sample and hold (709) the maximum value of inputted correlation value signal 119 according to the clock cycle shown by reference waveform signal 111, and accurately output the maximum value (127) in the unit time interval. Consequently, it is possible to determine the degree of synchronization time adjustment more accurately.

Further, with the present embodiment, as shown in FIG. 2, determination section 163 further has logical AND operation section 138, performs a logical AND operation on signal 135 and signal 137 and further generates pulse correlation detection signal 139 showing whether or not the peak of the received pulse is caught in difference detection signal 141. If the peak of the received pulse is caught in difference detection signal 141, this pulse correlation detection signal 139 becomes the high level signal and, if the peak is not caught in difference detection signal 141, becomes the low level signal.

(Synchronization Control Section)

Figure 7A:
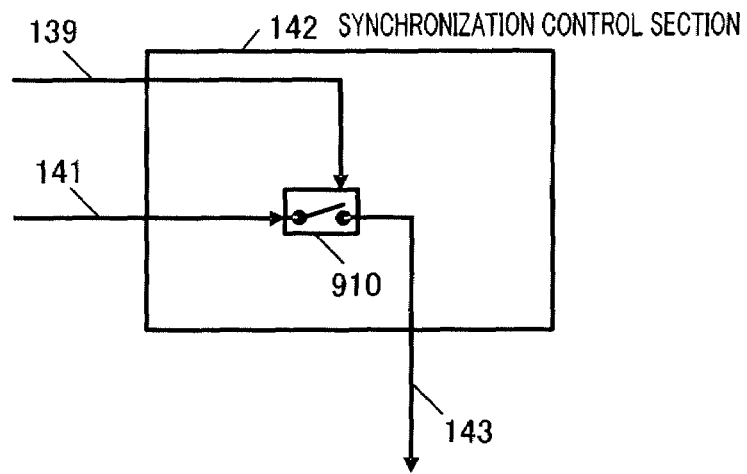
FIG. 7 shows a configuration of a synchronization control section according to Embodiment 1.

Synchronization control section 142 has a switch that controls the output of an input signal according to other input signals. FIG. 7A shows a configuration of the synchronization control section according to the present embodiment. In FIG. 7A, while pulse correlation detection signal 139 is the high level signal, switch 910 is turned on, and synchronization control section 142 outputs difference detection signal 141 as control signal 143. On the contrary, while pulse correlation detection signal 139 is the low level signal, switch 910 is turned off, and control signal 143 is not outputted.

The operation of adjusting the amount of delay in above-described variable signal delay section 108 of synchronizing waveform generation section 160 will be described. Upon receiving control signal 143, variable signal delay section 108 changes the delay time set therein. This amount of change in delay time is set in proportion to the absolute value of control signal 143. The direction of change is set to match with the phase lead or lag shown by control signal 143. By this means, when synchronization is shifted significantly, correction can be carried out so as to match the degree of the synchronization shift, and the converging time for synchronization becomes shorter compared to the case where the amount of change in the amount of delay is a fixed value.

Figure 7B:
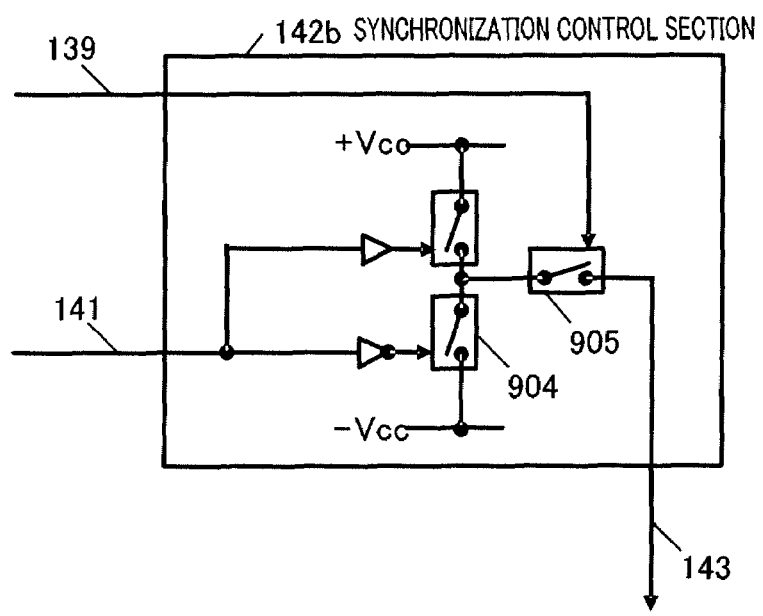

Further, FIG. 7B shows another configuration of the synchronization control section according to the present embodiment. In FIG. 7B, synchronization control signal 142b has switch 905 and charge pump circuit 904, determines that synchronization lags when the value of difference detection signal 141 is positive and outputs control signal 143 for controlling variable signal delay section 108 to decrease the amount of delay for synchronization timing signal 109. Synchronization control section 142b determines that synchronization leads when the value of difference detection signal 141 is negative, and outputs control signal 143 for controlling variable signal delay section 108 to increase the amount of delay for synchronization timing signal 109.

In this way, variable signal delay section 108 of synchronizing waveform generation section 160 is controlled to correct the synchronization timing. However, control signal 143 adjusts the amount of delay in variable signal delay section 108 and nevertheless specifies a certain amount of the increase and decrease in delay. Consequently, synchronization control section 142b is able to prevent overshoot in synchronization control compared to the configuration of synchronization control section 142 shown in FIG. 7A. Further, in FIG. 7B, similar to synchronization control section 142 shown in FIG. 7A, while pulse correlation detection signal 139 is the high level signal, switch 905 is turned on, and synchronization control section 142b outputs difference detection signal 141 as control signal 143.

Demodulation section 152 demodulates signal data 153 from detected signal 105 and reference waveform signal 111 where the delay time is adjusted by delay element 150. With the present embodiment, the amount of delay in delay element 150 is half the amount of delay $3\tau$ for delayed waveform signal 117 which is given the greatest delay by delay section 161, that is, the amount of delay in delay element 150 is $1.5\tau$.

(Description of Operation)

Next, the operation of the pulse radio receiving apparatus according to the present embodiment will be described.

In FIG. 2, pulse radio receiving apparatus 100 according to the present embodiment, first, detects the envelope of received signal 103 in detection section 104 and generates detected signal 105. Further, in synchronizing waveform generation section 160, reference waveform signal 111, similar to received signal 103, is generated by controlling the phase of reference waveform signal 111 according to inputted control signal 143. Further, with the present embodiment, the initial amount of delay in variable signal delay section 108 is the time $\tau$. Then, by delaying this reference waveform signal 111 in units of a certain amount of delay $\tau$ in delay section 161, a plurality of delayed waveform signals 113, 115 and 117 are generated.

(Correlation Processing)

Figure 8:
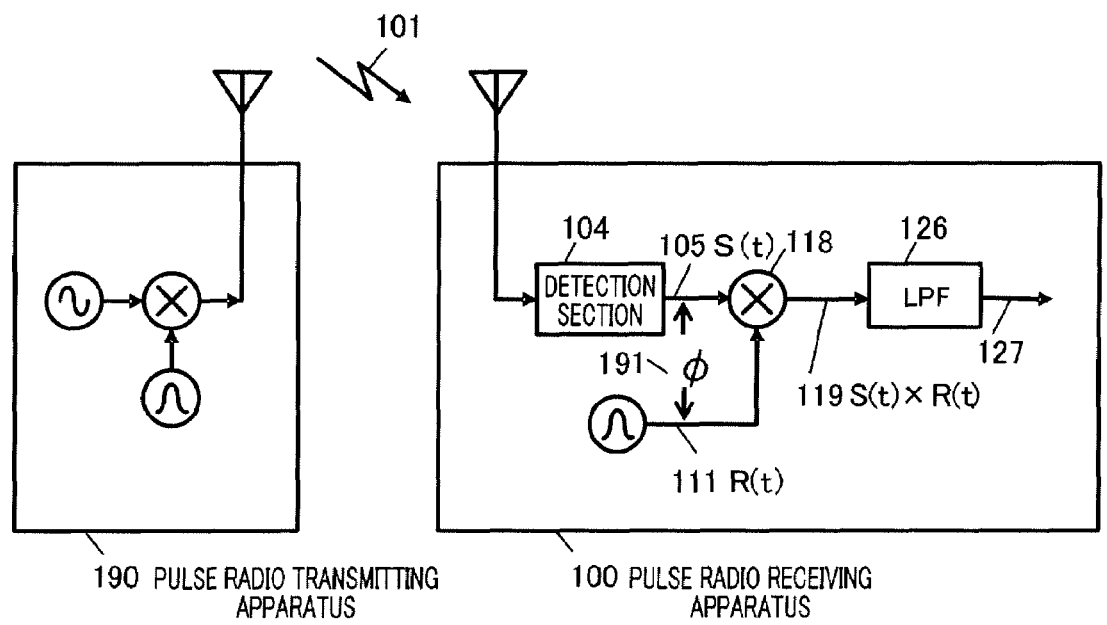
FIG. 8 illustrates an operation of the pulse radio receiving apparatus according to Embodiment 1.

Here, the operation of generating a correlation value signal in the correlation calculation section will be described with supplemental remarks. FIG. 8 illustrates the operation of the pulse radio receiving apparatus according to the present embodiment. In FIG. 8, pulse radio receiving apparatus 100 receives radio signal 101 transmitted from pulse radio transmitting apparatus 190 and generates detected signal 105 by detection section 104. There is phase difference 191($\phi$) between this detected signal 105 and reference waveform signal 111. Further, with the present embodiment, the waveforms of detected signal 105 and reference waveform signal 111 are the cosine waveforms represented by equation 1 and equation 2, respectively.

[1]
$$S(t)=\cos(2\pi t/T)+1+N(t) \qquad \text{(Equation 1)}$$

[2]
$$R(t)=\cos(2\pi t/T+\phi)+1 \qquad \text{(Equation 2)}$$

where T is the half-maximum pulse width of detected signal 105 and N(t) is the noise component.

Further, pulse radio receiving apparatus 100 outputs correlation value signal 119 showing the correlation value, that is, the waveform signal represented by S(t)×R(t), from first mixer 118 to obtain signal 127 subjected to equalization processing in integration section 126. The value obtained by integrating this correlation value signal 119 over a certain period more than the duration of the period of one pulse waveform is the correlation value. Further, in FIG. 8, assume that the value of signal 127 corresponds to the correlation value between detected signal 105 and reference waveform signal 111. Further, the same applies to signals of other sequences generated in correlation calculation section 162 in FIG. 2, that is, correlation value signals 121, 123 and 125 between detected signal 105 and delayed waveform signals 113, 115 and 117.

Figure 9A:
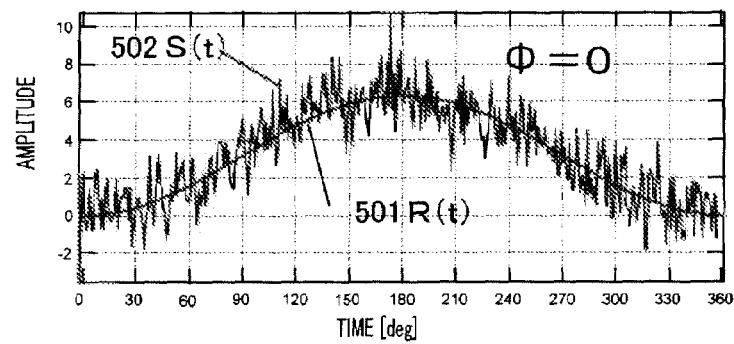
FIG. 9 is a waveform diagram illustrating the relationship between the operation of the correlation calculation section, the phase difference and the correlation value according to Embodiment 1.
Figure 9B:
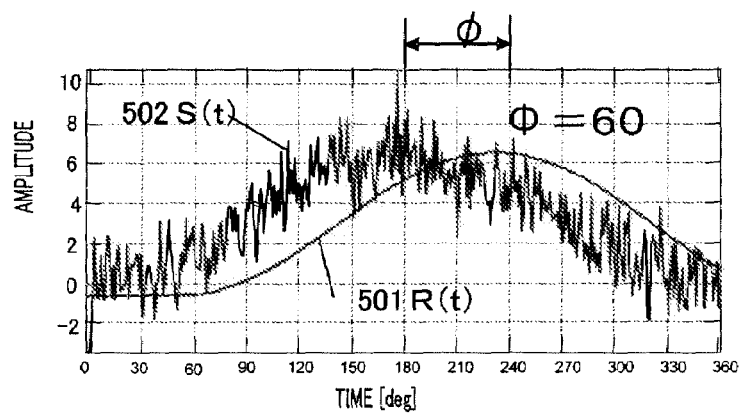
Figure 9C:
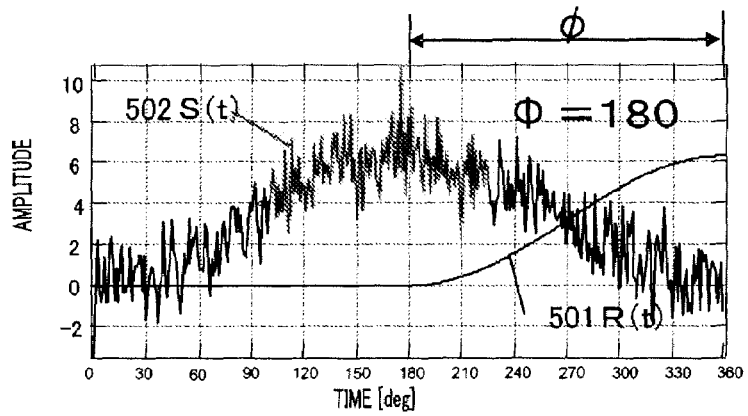

FIG. 9A to FIG. 9C illustrate the operation of the correlation calculation section. Examples of the waveforms of the phases of detected signal 502 and reference waveform signal 501 are shown in the time domain. In FIG. 9A, detected signal 502 and reference waveform signal 501 have zero phase difference $\phi$ and peak at 180 degrees (deg). In FIG. 9B and FIG. 9C, waveform examples are shown in a case where the phase difference $\phi$ is 60 degrees and in a case where the phase difference $\phi$ is 180 degrees. In FIG. 9B and FIG. 9C, the phase of reference waveform signals 501 lags 60 degrees and 180 degrees behind detected signals 502.

Figure 9D:
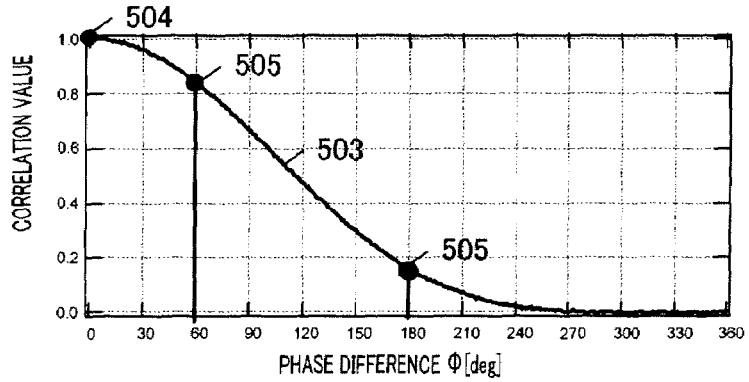

FIG. 9D shows the relationship between the phase difference and the correlation value between detected signal 502 and reference waveform signal 501. Further, correlation value 503 shows normalized values where the absolute value of phase difference $\phi$ is the horizontal axis given that signal value 504 at phase differences $\phi$=zero is one. Correlation value 503 takes the same value irrespective of which of two signals leads and decreases in reverse proportion to the increase in the phase difference.

With the present embodiment, the detected signal and the reference waveform signal have cosine waveforms as described above, and delay time $\tau$ in first to third delay elements 112, 114 and 116 is $\tau$=T/4. According to this configuration, 2T is 360 degrees. Consequently, if synchronized reception is established in pulse radio receiving apparatus 100, a correlation result (505) is obtained from signal 129 in a case where the phase is shifted by minus 60 degrees from phase difference $\phi$, that is, the phase is shifted by minus 1.5$\tau$. Further, a pattern is possible where whether the shape of the envelope of a signal waveform is a cosine waveform or is different from a cosine waveform, the phase intervals between impulses are adjusted such that phase of waveforms is determined in a reliable manner by randomizing delay times for delay elements.

(Phase Shift Detection Processing)

Next, pulse radio receiving apparatus 100 according to the present embodiment generates, in parallel, correlation value signals 119, 121, 123 and 125 showing the correlations between detected signal 105 and reference waveform signal 111 and a plurality of delayed waveform signals 113, 115 and 117 in correlation calculation section 162. Determination section 163 generates difference detection signal 141 showing the direction and degree of the phase shift between received signal 103 and reference waveform signal 111 based on the relative scales between combinations of correlation values shown by these correlation value signals 119, 121, 123 and 125. At the same time, a logical AND operation is performed on signal 135 and signal 137 and pulse correlation detection signal 139 showing whether or not the peak of the received pulse is caught in difference detection signal 141, is further generated.

Figure 10A:
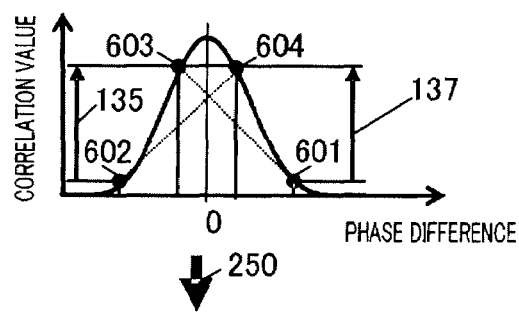
FIG. 10 illustrates an operation of a determination section according to Embodiment 1.
Figure 10A:
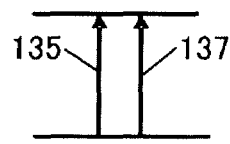
Figure 10B:
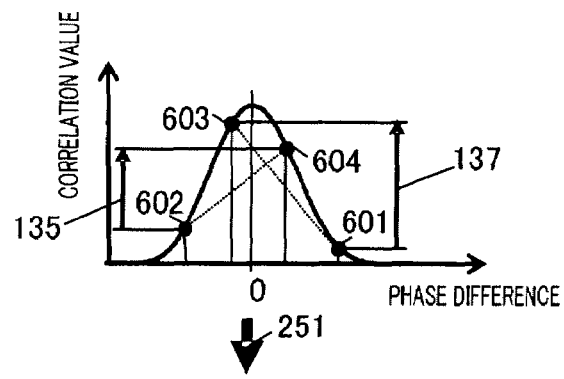
Figure 10B:
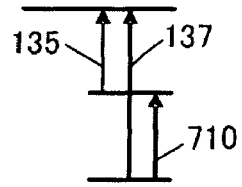
Figure 10C:
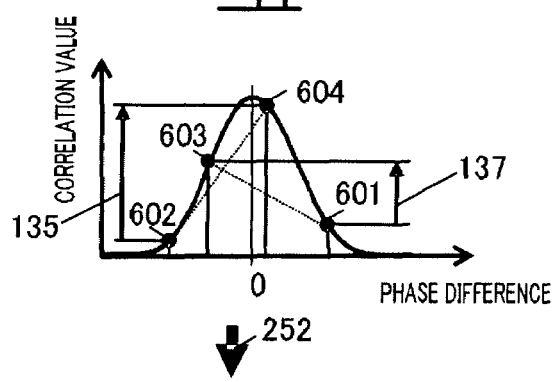
Figure 10C:
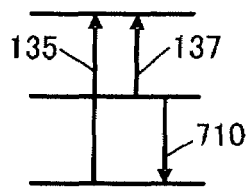

Here, the phase shift determination operation in determination section 163 will be described with supplemental remarks. FIG. 10A to FIG. 10C illustrate the operation of the determination section according to the present embodiment. In FIG. 10A to FIG. 10C, correlation value signals 119, 121, 123 and 125 are plotted (601, 602, 603, and 604) where the phase difference between the reference waveform signal and delayed waveform signal is the horizontal axis given that the phase of the received signal is zero. Determination section 163 calculates first difference 137 between correlation value 603 of correlation value signal 123 and correlation value 601 of correlation value signal 119 and second difference 135 between correlation value 604 of correlation value signal 121 and correlation value 602 of correlation value signal 125, and compares first difference 137 and second difference 135.

Here, as shown in FIG. 10A, if synchronized reception is established, determination section 163 determines that, as a result of comparison (250), the two values are equal. In this case, determination section 163 outputs as difference detection signal 141 a signal showing that there is no phase shift between the received signal and signal sequences of the reference waveform signal and delayed waveform signals, and that the difference between values of signal 135 and signal 137 is zero upon comparison of these values. Further, although a case will be described with the present embodiment where no signal is outputted when there is no phase shift, a pattern is possible where a zero level signal is outputted.

Further, as shown in FIG. 10B, if synchronized reception leads, determination section 163 similarly determines, as a result of comparison (251), that first difference 137 is greater than second difference 135 and that the synchronizing position leads by difference 710 between first difference 137 and second difference 135. In this case, determination section 163 outputs as difference detection signal 141 a signal which shows a positive value and which shows this difference 710. Further, the degree of phase shift is proportional to the value of difference detection signal 141.

Further, as shown in FIG. 10C, if synchronized reception lags, determination section 163 similarly determines, as a result of comparison (252), that first difference 137 is less than second difference 135 and that the synchronizing position lags by difference 710 between first difference 137 and second difference 135. In this case, determination section 163 outputs as difference detection signal 141 a signal which shows a negative value showing this difference 710.

Further, although the present embodiment has been described on the condition that pulse correlation detection signal 139 is outputted to synchronization control section 142, if for the purpose of maintaining synchronization, pulse correlation detection signal 139 needs not to be outputted to synchronization control section 142. That is, the input signal equivalent to pulse correlation detection signal 139 inputted to synchronization control section 142 may be "positive" all the time. However, if the synchronizing position is off the pulse position and synchronization cannot be established, the value of at least one of signal 135 and signal 137 is negative. Consequently, with the present embodiment, when logical AND operation section 138 performs a logical AND operation on signal 135 and signal 137 and one of signal 135 and signal 137 takes a negative value, even if difference signal detection signal 141 shows that a signal is detected, because the synchronizing position is inaccurate and should not be utilized for synchronization control, and, as described above, determination section 163 does not output pulse correlation detection signal 139. On the other hand, when signal 135 and signal 137 take positive values at the same time, the peak of the received pulse is caught in difference detection signal 141, and pulse correlation detection signal 139 showing that there is the state where synchronization can be established, is outputted to synchronization control section 142 at the same time.

(Phase Control and Demodulation Processing)

Next, pulse radio receiving apparatus 100 according to the present embodiment determines whether or not to generate control signal 143 in synchronization control section 142 according to the value this pulse correlation detection signal 139 shows. When determining to generate control signal 143, synchronization control section 142 generates control signal 143 for controlling the phase of reference waveform signal 111, from difference detection signal 141 of synchronization control section 142, and outputs control signal 143 to synchronizing waveform generation section 160. Then, synchronizing waveform generation section 160 receiving control signal 143 as input, adjusts the phase of reference waveform signal 111 to output.

Further, pulse radio receiving apparatus 100 according to the present embodiment demodulates signal data 153 in demodulation section 152 from detected signal 105, and signal 151 obtained by delaying reference waveform signal 111 by time 1.5τ. Subsequently, pulse radio receiving apparatus 100 repeats the above-described synchronized reception and demodulation operations.

Here, the demodulation operation in the case where synchronization is established will be described with supplemental remarks. As shown in FIG. 10A, if synchronization is established, the timing where the maximum correlation value is obtained comes between the timing in second delay element 112 (delay time τ) and the timing in third delay element 114 (delay time 2τ). Consequently, demodulation section 152 generates signal 151 by delaying reference waveform signal 111 by time 1.5τ in reception delay element 150 in FIG. 2. Then, using this signal as the clock signal, the sign of detected signal 105 is determined and signal data 153 is demodulated.

By employing this configuration, pulse radio receiving apparatus 100 according to the present embodiment generates the correlation values between a received signal and a plurality of reference signals of different phases, makes relative comparisons of the relative scales of differences between these combinations of correlation values and determines the direction of phase adjustment for synchronization. Consequently, even if the S/N ratio of the received signal varies, as a result, it is possible to reduce the time required to establish synchronization.

(Another Configuration)

Figure 11:
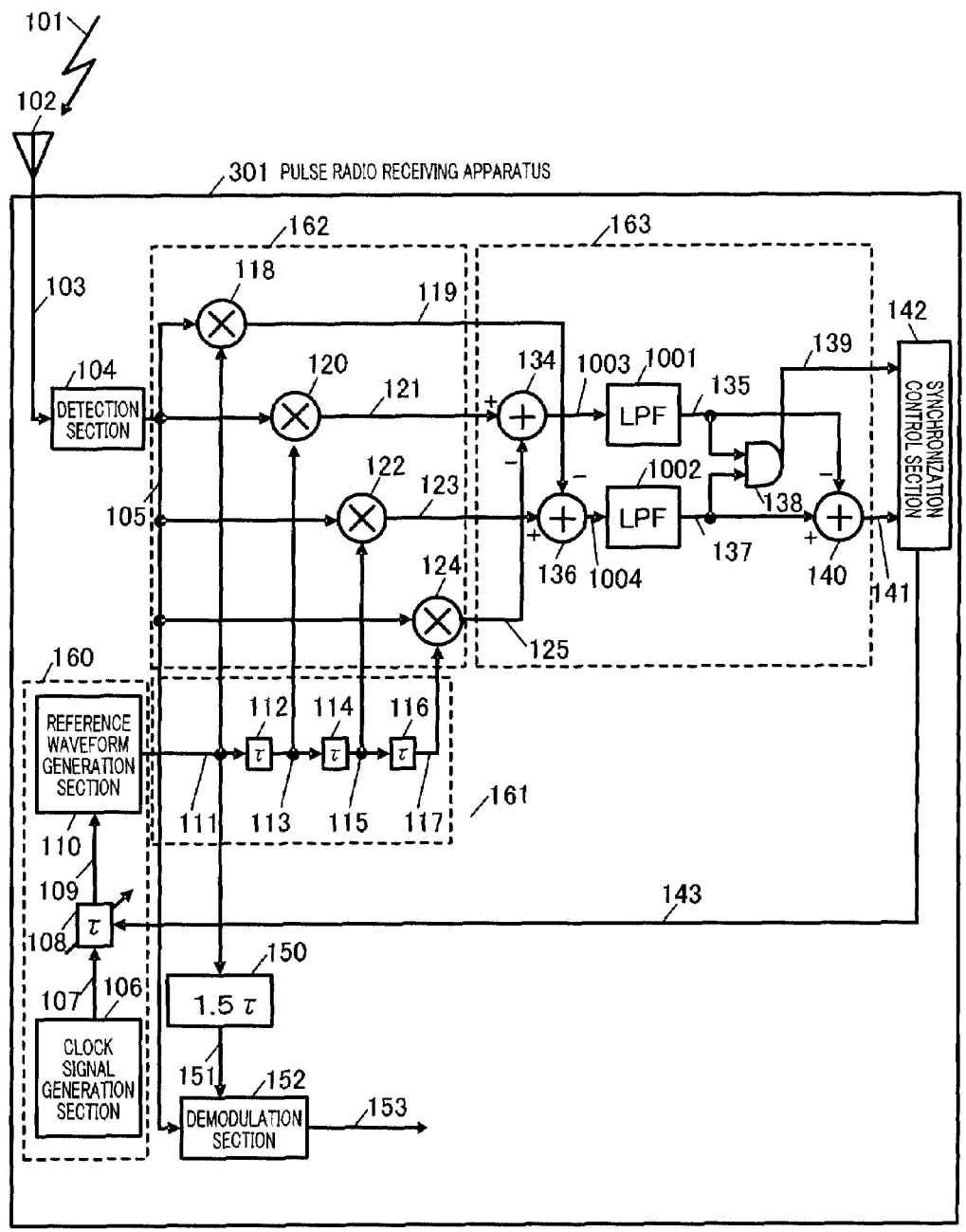
FIG. 11 shows another configuration of the pulse radio receiving apparatus according to Embodiment 1.

Further, with the present embodiment, determination section 163 of pulse radio receiving apparatus 100 generates two pairs of signals, the relative scales of which are compared, by equalizing and adding correlation value signals. However, as shown in FIG. 11, by adding and then equalizing two pairs of correlation value signals, it is possible to reduce the number of configurations of the integration section and realizes a simpler configuration. FIG. 11 shows another configuration of the pulse radio receiving apparatus according to the present embodiment. In FIG. 11, determination section 163 of pulse radio receiving apparatus 301 adds correlation value signal 121 and the signal inverting correlation value signal 125 outputted from correlation calculation section 162 in signal addition section 134, and generates added signal 1003. Further, signal addition section 136 adds correlation value signal 123 and the signal inverting correlation value signal 119, and generates added signal 1004. Then, signals 135 and 137 are generated by equalizing generated added signals 1003 and 1004 in integration sections 1001 and 1002, and signal 137 and the signal inverting signal 135 are added in signal addition section 140, and the relative scale between signal 137 and signal 135 is compared and determined.

Here, the additions and subtractions in first and second signal addition sections 134 and 136 are linear processings, and, given that additions and subtractions of integration values are equal to integration of addition and subtraction values, the above described configuration of decision section 163 of pulse radio receiving apparatus 100 is possible. The configuration shown in FIG. 11 produces signals equivalent to signal 135 and signal 137 using half the number of integration sections compared to the configuration of FIG. 2. Consequently, it is possible to reduce the manufacturing cost by a simple circuit configuration and reduce power consumption during the operation. However, it is necessary to set the dynamic range of integration sections larger compared to the configuration shown in FIG. 2.

Figure 12:
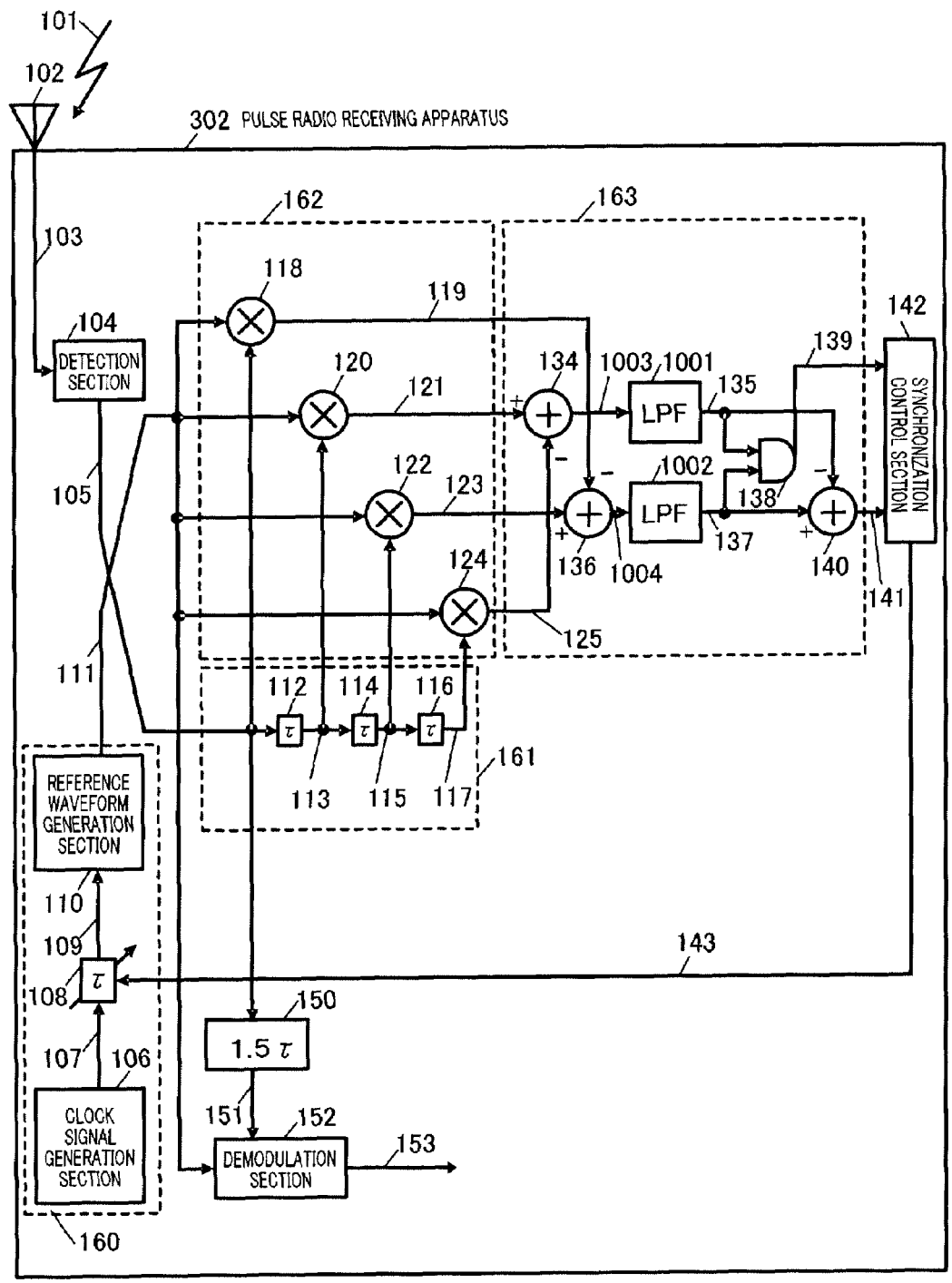
FIG. 12 shows another configuration of the pulse radio receiving apparatus according to Embodiment 1.

Further, with the present embodiment, pulse radio receiving apparatuses 100 and 301 are configured to input detected signal 105 to correlation calculation section 162 and input reference waveform signal 111 of synchronizing waveform generation section 160 to delay section 161 as the original waveform signal. However, a configuration is possible where these signals (105 and 111) may be inputted in a switched manner. FIG. 12 is another configuration of the pulse radio receiving apparatus according to the present embodiment. In FIG. 12, pulse radio receiving apparatus 302 inputs reference waveform signal 111 to correlation calculation section 162, detected signal 105 to delay section 161 as the original waveform signal and adjusts phases for synchronization. According to this configuration, pulse radio receiving apparatus 302 carries out the same operation as in the configurations shown in FIG. 2 and FIG. 11. This is because, in the configurations of pulse radio receiving apparatuses 100 and 301 shown in FIG. 2 and FIG. 11, detected signal 105 and reference waveform signal 111 are inputted as is to subsequent signal processing circuits. By this means, correlation value signals can be generated by applying clock signals containing little noise, to the branched input ends, so that, even when significant noise is contained in the received signal, it is possible to determine the direction of phase adjustment more accurately.

Figure 13:
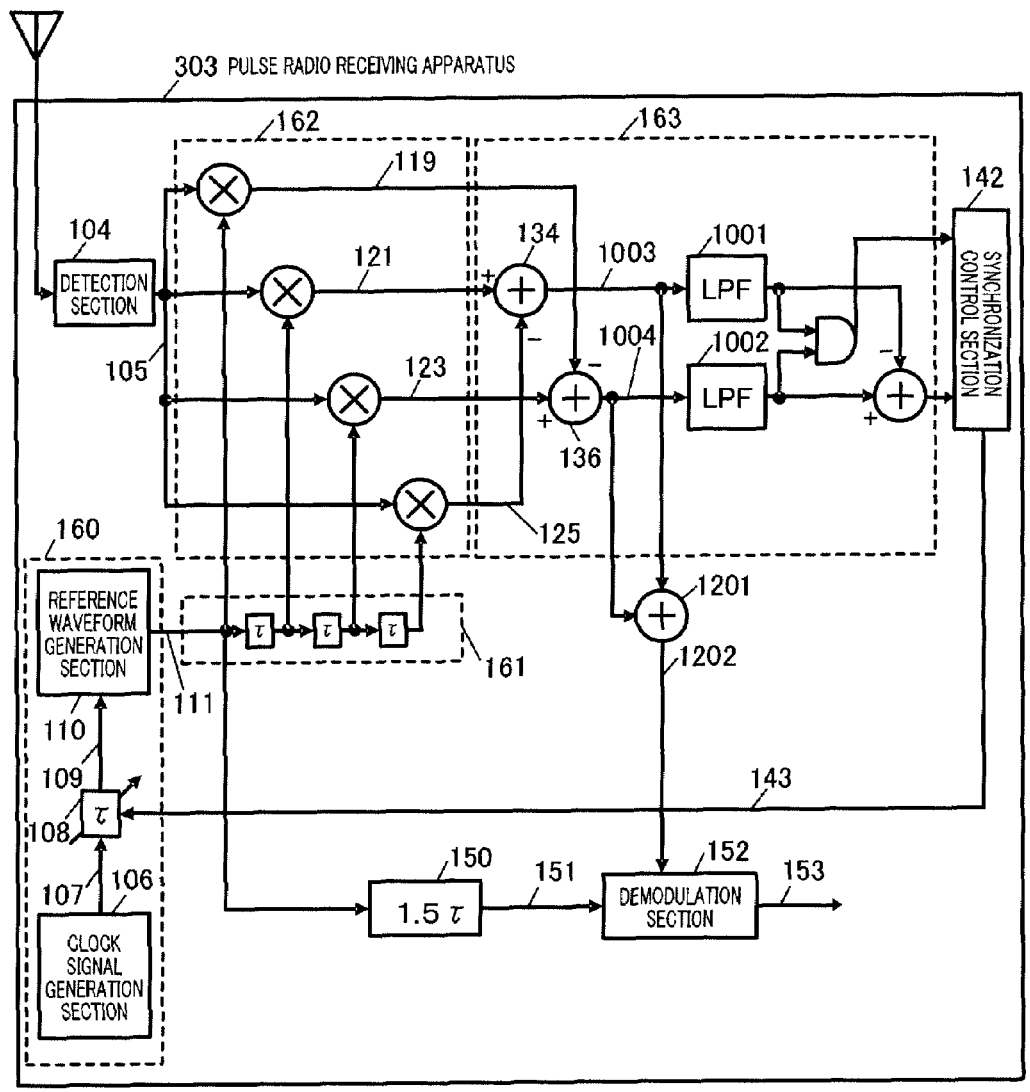
FIG. 13 shows another configuration of the pulse radio receiving apparatus according to Embodiment 1.
Figure 14A:
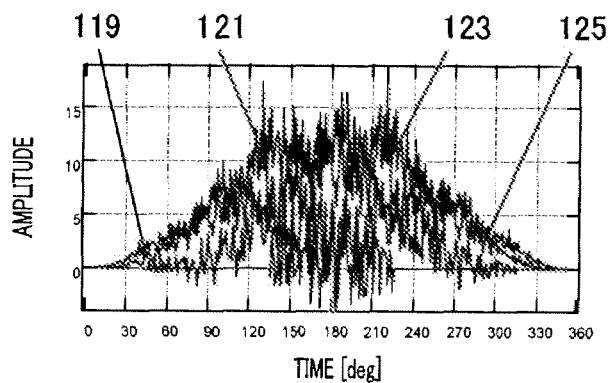
FIG. 14 is a waveform diagram illustrating the operation of a demodulation section according to Embodiment 1.
Figure 14B:
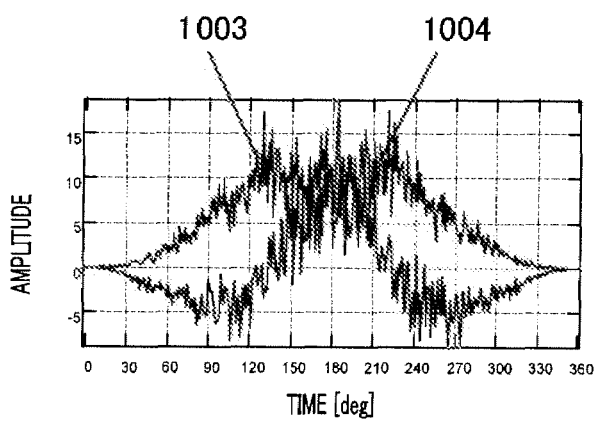
Figure 14C:
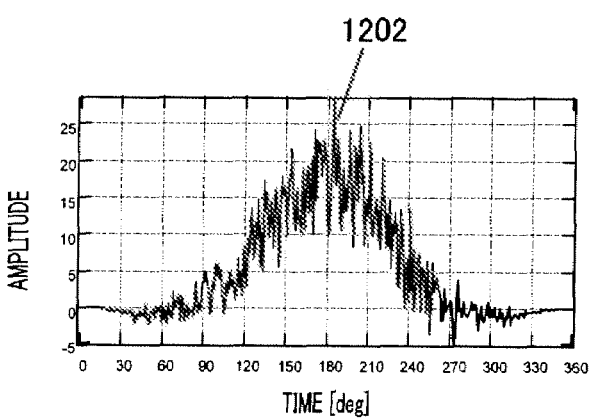

Further, pulse radio receiving apparatus 301 shown in FIG. 11 employs a pattern where demodulation section 152 demodulates detected signal 105 at the timing of signal 151 delayed by 1.5τ. However, a pattern is possible where the signal obtained by adding signals 1003 and 1004 is used instead of detected signal 105. FIG. 13 shows another configuration of the pulse radio receiving apparatus according to the present embodiment. In FIG. 13, pulse radio receiving apparatus 303 generates demodulation target signal 1202 by adding signal 1003 and signal 1004 in adder 1201 and demodulates signal data 153 using signal 151 obtained by delaying reference waveform signal 111 by time 1.5τ. Here, the operation of pulse radio receiving apparatus 303 to generate demodulation target signal 1202 from correlation value signals 119, 121, 123 and 125 will be described using a waveform diagram. FIG. 14A is a waveform diagram of correlation value signals 119, 121, 123 and 125. The phases of these signals are shifted 60 degrees each. FIG. 14B is a waveform diagram of signals 1003 and 1004. FIG. 14C is a waveform diagram of signal 1202. By means of this configuration, pulse radio receiving apparatus 303 is able to carry out demodulation processing with fewer errors based on a signal from which an unnecessary signal, which is not correlated with reference waveform signal 111, is removed.

Figure 15:
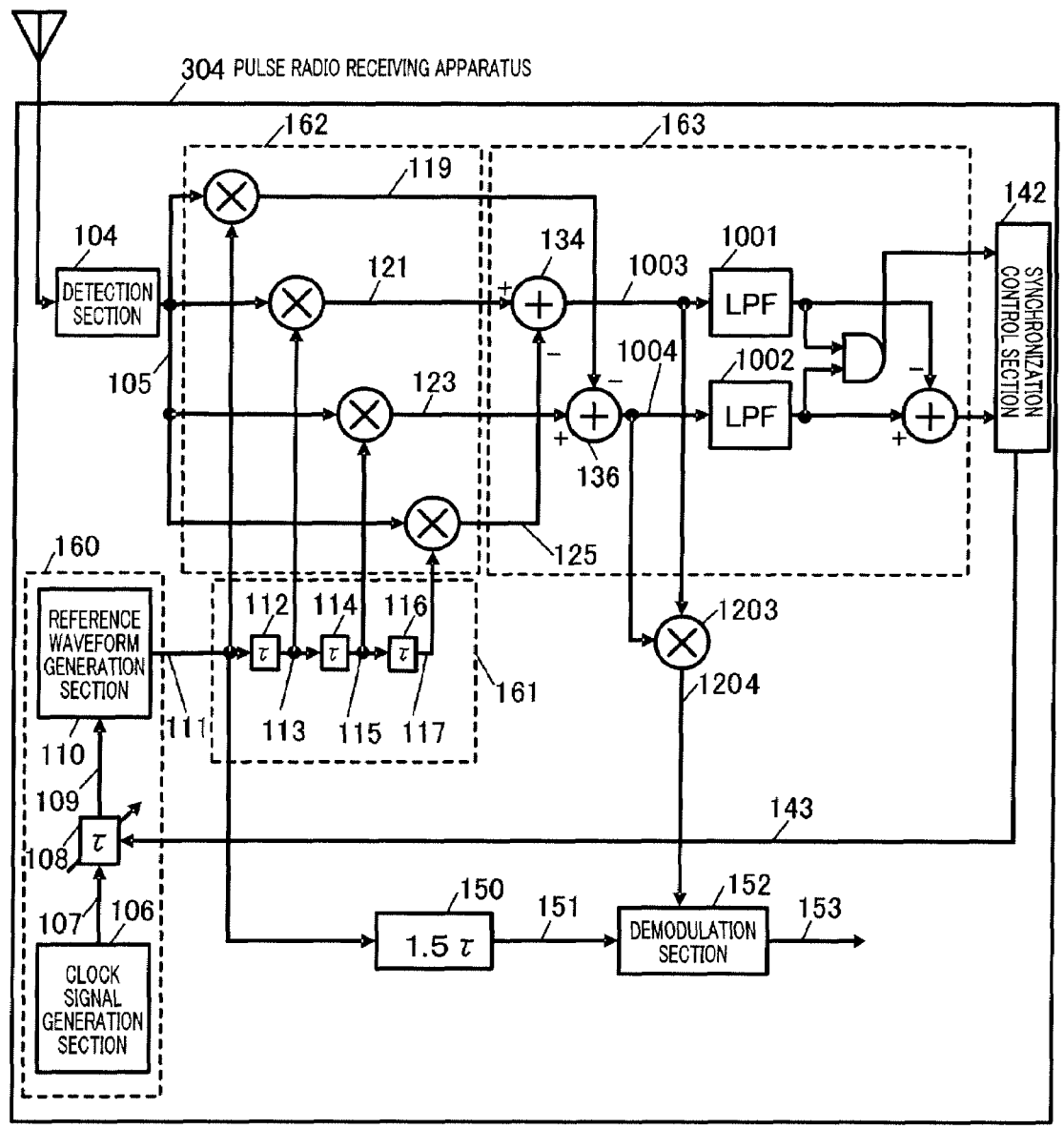
FIG. 15 shows another configuration of the pulse radio receiving apparatus according to Embodiment 1.

Further, although, with the configuration shown in FIG. 13, a pattern is employed where demodulation target signal 1202 is generated by adder 1201, a pattern is equally possible where signal 1202 is generated by a multiplier. FIG. 15 shows another configuration of the pulse radio receiving apparatus according to the present embodiment. In FIG. 15, pulse radio receiving apparatus 304 generates signal 1204 by multiplying signal 1003 by signal 1004. However, when the signal for demodulation is generated by adding signal 1003 and signal 1004, the shift of the signal waveform to generate is corrected. Consequently, in a state where the synchronizing positions are shifted, the demodulation error rate due to the shift of the positions is lower in a pattern of adding signals 1003 and 1004 and generating signal 1202.

Further, although, with the present embodiment, the pulse modulation scheme for a signal received by the pulse radio receiving apparatus has been described with reference to the on-off keying scheme, the present invention is applicable to other modulation schemes such as the bi-phase modulation scheme, which carries out modulation using impulse signals at regular intervals according to the phase of a pulse matching transmission data, or the pulse position modulation (PPM) scheme, which shifts the pulse positions according to transmission data. In the case of the bi-phase modulation scheme, a modulated wave is a sequence of impulses at regular intervals, so that the configuration according to the present invention is applicable. Further, in the case of the pulse position modulation scheme, by providing a preamble for synchronization which is a sequence of impulses at regular intervals such as an impulse sequence which is not modulated, the synchronization method according to the present invention is applicable.

Further, although a case has been described with the above description where reference waveform generation section 110 generates reference waveform signal 111, similar to the waveform of detected signal 105 in the marks in on-off keying (see equation 1 and equation 2), from synchronization timing signal 109 using low pass filter 203, reference waveform signal 111 is not limited to signals similar to detected signal 105. For example, reference waveform signal generation section 110 may use synchronization timing signal 109 as is as reference waveform signal 111 without using low pass filter 203. That is, reference waveform generation section 110 may generate as reference waveform signal 111 signals showing analogue values only at predetermined timings and showing zeroes at the other timings.

[3]

$$R(t) = \alpha \delta(t) \qquad \text{(Equation 3)}$$

where $\alpha$ is a constant and $\delta(t)$ is the delta function.

Further, with the above description, radio signal 101 modulated according to the on-off keying modulation scheme is transmitted from pulse radio transmitting apparatus 190 shown in FIG. 8 and pulse radio receiving apparatus 100 detects the envelope of radio signal 101 in detection section 104 and demodulates the signal, the same effect can be obtained by carrying out the same processing even when demodulation utilizing the carrier phase is carried out without detection section 104 that carries out envelope detection. The operation of determining a phase shift of when demodulation is carried out utilizing the carrier phase, without envelope detection, will be described with supplemental remarks. Further, assume that reference waveform generation section 110 generates as reference waveform signal 111 the signal represented by equation 3.

Delay section 161 outputs reference waveform signal 111 and delayed waveform signals 113, 115 and 117 obtained by delaying reference waveform signal 111 by time τ in first to third delay elements 112, 114 and 116 each.

Figure 16:
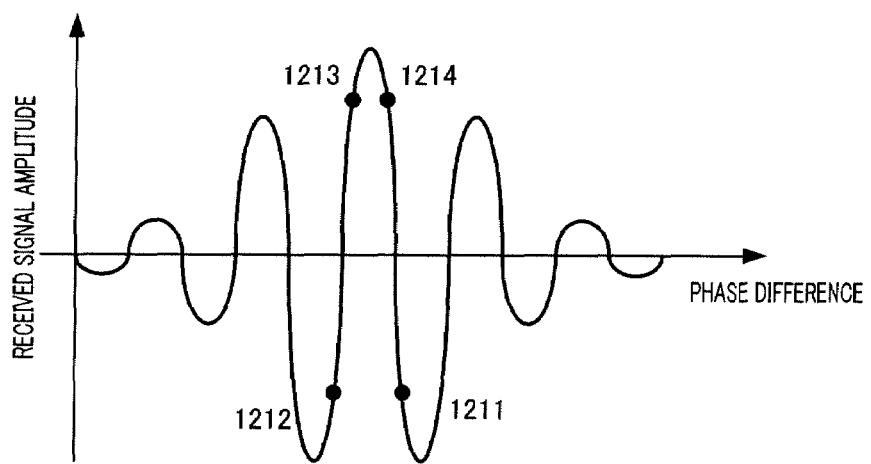
FIG. 16 illustrates the operation of the determination section according to Embodiment 1.

In this case, first to third delay elements 112, 114 and 116 each apply as delay time τ an amount of delay of a value that produces a plurality of correlation value signals in the range of the cycle of the carrier frequency of received signal 103. By this means, as shown in FIG. 16 (described later), adequate correlation values are included in one cycle of the carrier frequency, so that it is possible to determine the direction of phase adjustment for synchronization more correctly. As a result, it is possible to reduce the time required to acquire an accurate synchronization timing.

Correlation calculation section 162 mixes received signal 103, reference waveform signal 111 and delayed waveform signals 113, 115 and 117 obtained by delaying reference waveform signal 111 by time τ in first to fourth mixers 118, 120, 122 and 124 each and outputs first to fourth correlation value signals 119, 121, 123 and 125. As described above, reference waveform signal 111 shows analogue values only at predetermined timings represented by equation 3 and shows zeroes at the other timings. Consequently, first to fourth mixers 118, 120, 122 and 124 mix received signal 103, reference signal 111 and delayed waveform signals 113, 115 and 117 obtained by delaying reference waveform signal 111 in units of time τ, and thereby correlation calculation section 162 samples received signal 103 every delay time τ.

FIG. 16 illustrates the operation of the determination section in this case. In FIG. 16, correlation value signals 119, 121, 123 and 125 are plotted (1211, 1212, 1213 and 1214) where the phase difference between the reference waveform signal and delayed waveform signals is the horizontal axis given that the phase of the received signal is zero. For example, similar to the case of FIG. 10, determination section 163 calculates first difference 137 between correlation value 1213 of correlation value signal 123 and correlation value 1211 of correlation value signal 119 and second difference 135 between correlation value 1214 of correlation value signal 121 and correlation value 1212 of correlation value signal 125 and compares first difference 137 and second difference 135. Subsequently, the operation of determining the phase shift is the same as in the above-described operation and will not be described below. Further, the phase control method and demodulation method are the same as in the case of using detection section 104 and so will not be described.

If detection is carried out using phase information, it is possible to carry out more precise demodulation and synchronization. In this way, any demodulation method utilizing envelope detection or utilizing the carrier phase is applicable to radio signal 101 which is modulated according to the on-off keying modulation scheme.

Figure 17:
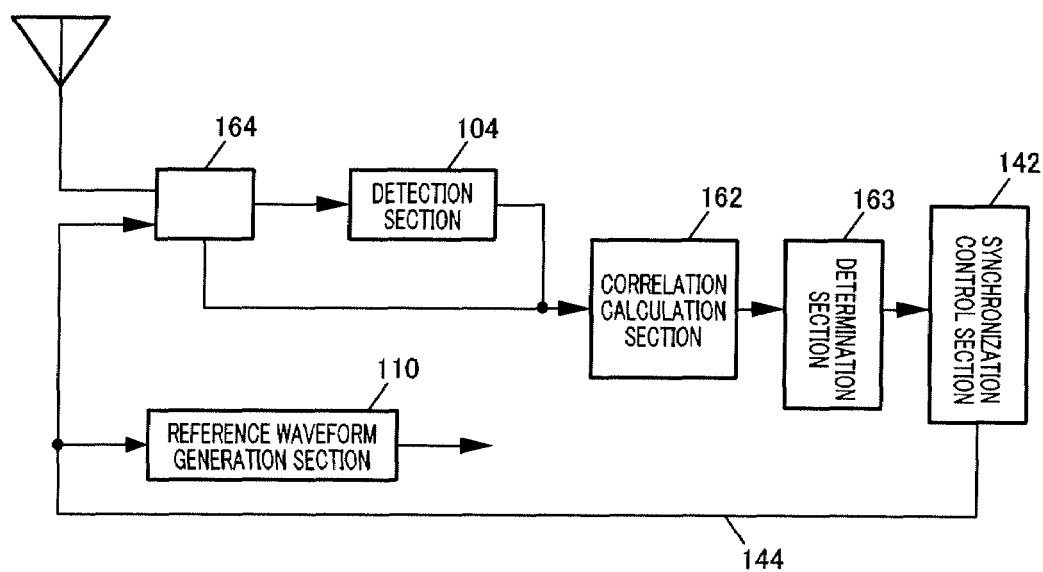
FIG. 17 is part of another configuration of the pulse radio receiving apparatus according to Embodiment 1.

Consequently, for example, as shown in FIG. 17, it is possible to provide switch 164 between a receiving antenna and detection section 104 and switch between a detection scheme using envelope information detected by detection section 104 and a detection scheme using phase information by switching switch 164 according to control signal 144 outputted from synchronization control section 142 (or synchronization control section 142b). For example, information about demodulation and synchronization performance required in the pulse radio receiving apparatus is provided in the control signal in this case.

Further, although a case has been described with the above embodiment where the on-off keying modulation scheme is employed, the modulation scheme is not limited to amplitude modulation including on-off keying, and the same effect can be obtained by carrying out the same processing upon phase modulation. Available phase modulation includes, for example, BPSK (Bi-Phase Shift Keying) modulation and QPSK (Quadrature Phase Shift Keying) modulation. In amplitude modulation such as ASK, demodulation can be carried out by any detection scheme whether or not detection section 104 employing the envelope detection scheme is used, but it is difficult to carry out detection by phase and frequency modulation such as PSK and FSK using only envelope information.

Consequently, for example, in FIG. 17, it is possible to output information about the modulation scheme as a control signal to switch 164 from synchronization control section 142 (or synchronization control section 142*b*) and select between using the envelope detection scheme using detection section 104 and using a detection scheme using phase information without using detection section 104 by switching switch 164 according to this control signal. The method of determining the phase shift, and controlling and modulating phases is the same as in the case of using detection section 104 and so will not be described.

Further, although a case has been described with the above description using FIG. 2 where detection section 104 carries out envelope detection and one sequence of detected signal 105 is received and demodulated, detection section 104 may employ a quadrature detection configuration such that the two sequences of the I and Q signals are received and demodulated to support QPSK modulated signals. A case where received signal 103 is a QPSK signal will be described with supplemental remarks below.

Figure 18:
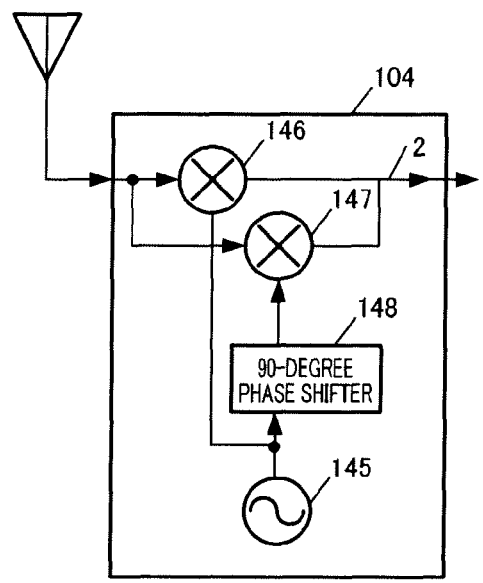
FIG. 18 shows another configuration of the detection section according to Embodiment 1.

FIG. 18 shows a general configuration in the case where detection section 104 employs a quadrature detection configuration. Detection section 104 has LO signal source 145, two mixers 146 and 147 for generating I and Q signals and 90-degree phase shifter 148. By this means, detection section 104 generates both I and Q signals and outputs the two signals.

Consequently, the components, including the synchronizing waveform generation section, delay section, correlation calculation section, determination section and synchronization control section, may be configured to be provided in parallel, so that, in the case of two sequences of the components, the same phase shift determination and phase control as in the case of one sequence can be carried out and the two, I and Q signals can be maintained together. Further, instead of maintaining the two, I and Q signals together, only one of the I signal and the Q signal may be maintained, or, by adding, combining or multiplying both signals or adding the absolute values, the I and Q signals may be utilized as one signal. In these cases, the synchronizing waveform generation section, delay section, correlation calculation section, determination section and synchronization control section may be provided only for one sequence, so that it is possible to avoid increasing the circuit scale of the pulse receiving apparatus.

Further, it naturally follows that the same effect can be obtained by carrying out the same processing with respect to the signal obtained by carrying out down-conversion processing on received signal 103 into an intermediate frequency.

Further, although a case has been described with the above description where, as shown in FIG. 10, in four determination points 601 to 604, determination points 601 and 602 are combined with 603 and 604 respectively and these two combinations are compared, the combinations may be changed and compared using only two or three of four determination points instead of using all of the four determination points. For example, four determination points may be used to establish synchronization and only inner two determination points are used to maintain synchronization. If the number of determination points used for combinations increases, the direction of phase shift can be specified more accurately, so that it is possible to reduce the time it takes to establish synchronization by using more determination points upon establishing synchronization. Further, phase shift can be corrected using two inner determination points upon maintaining synchronization, so that it is possible to reduce arithmetic operation processing such as correlation arithmetic operation by decreasing the number of determination points to be used upon maintaining synchronization, and, consequently, reduce power consumption.

Further, although a case has been described with the above description where the number of points used for determination is four, the determination accuracy may be improved by using five or more determination points and increasing the number of the combinations.

Further, although, with the above description, delay time $\tau$, which defines the interval between determination points, is a small value, less than half the symbol length, the amount of delay from the reference waveform signal which is each given from first to third delay element 112, 114 and 116 may be less than half the symbol length. By this means, if the peak of detected signal 105 subjected to envelope detection using detection section 104 is caught, first to fourth correlation value signals 119, 121, 123 and 125 can be obtained within half the symbol length, so that it is possible to determine the direction of phase adjustment for synchronization in a more reliable manner.

Further, although a case has been described with the above description where delay time $\tau$ defines the intervals between determination points, the present invention is not limited to this and the intervals between determination points may be appropriately changed. When the intervals between determination points become longer, the time to find the received pulse becomes shorter, and so the time it takes to establish synchronization is reduced, and, when the intervals between determination points become shorter, the portion where the amplitude value is significant can be used for determination, so that the jitter upon maintaining synchronization is less and it is possible to improve a synchronization accuracy. It naturally follows that the intervals between determination points may be controlled to improve performance of both establishing and maintaining synchronization by making variable the intervals between determination points.

Further, a case has been described with the above description where, using a plurality of mixers, correlation calculation section 162 generates, in parallel, correlation value signals 119, 121, 123, and 125 showing the correlations between detected signal 105, and reference waveform signal 111 and a plurality of delayed waveform signals 113, 115 and 117. Further, it naturally follows that a configuration is possible where the number of mixers is decreased and a plurality of correlation value signals are generated by sampling reference waveform signal 111 with different amounts of delay.

Further, the above description assumes a case where, in a state where synchronization can be established, synchronization is further maintained. When logical AND operation section 138 performs a logical AND operation on signal 135 and signal 137 and at least one of signal 135 and signal 137 takes a negative value, even if difference signal detection signal 141 shows that a signal is detected, determination section 163 determines that the synchronizing position for the detected signal is inaccurate and should not be used for synchronization control and does not output pulse correlation detection signal 139.

In addition, before synchronization can be established, even if determination section 163 determines that the synchronizing position is inaccurate and should not be used for synchronization control, for example, the amount of delay may be controlled to increase or decrease by the predetermined time. The control in this case will be described with supplemental remarks using FIG. 19 below.

Figure 19A:
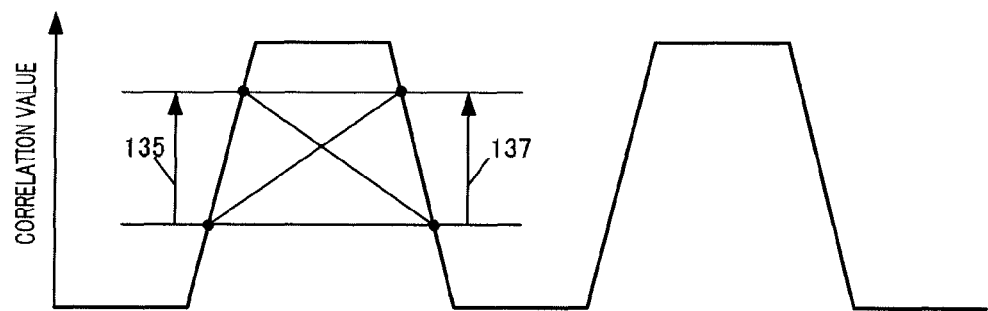
FIG. 19 illustrates the operation of the determination section according to Embodiment 1.
Figure 19B:
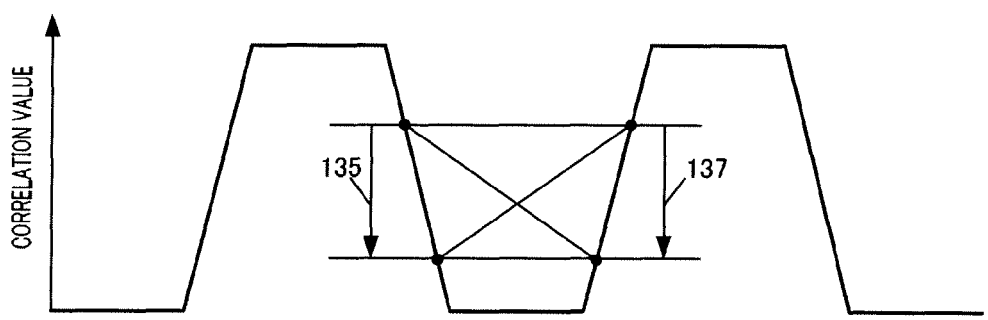

FIG. 19 shows the arrangement of determination points in a state where synchronization is established in-phase and out-of-phase. In the same figure, FIG. 19A shows the state where synchronization is established in-phase and FIG. 19B shows the state where synchronization is established out-of-phase. As shown in FIG. 19B, in the state where synchronization is established out-of-phase, signal 135 and signal 137 are negative, and so pulse correlation detection signal 139 is not outputted and the phase shift is not corrected at all. Therefore, before synchronization can be established, the synchronizing position is not correct, and, even when it is determined that synchronization is not established, the synchronizing position can be shifted by carrying out control, for example, the amount of delay may be controlled to increase or decrease by the predetermined time, so that it is possible to reduce the time it takes to establish synchronization.

Embodiment 2

Next, the pulse radio receiving apparatus according to Embodiment 2 of the present invention will be described. The pulse radio receiving apparatus according to the present embodiment increases the number of times for comparing correlation between the received signal and the reference signal waveform and increases the number of correlation value signals, thereby determining the direction and degree of phase adjustment more correctly and further reducing the time required to establish synchronization.

(Overall Configuration)

Figure 20:
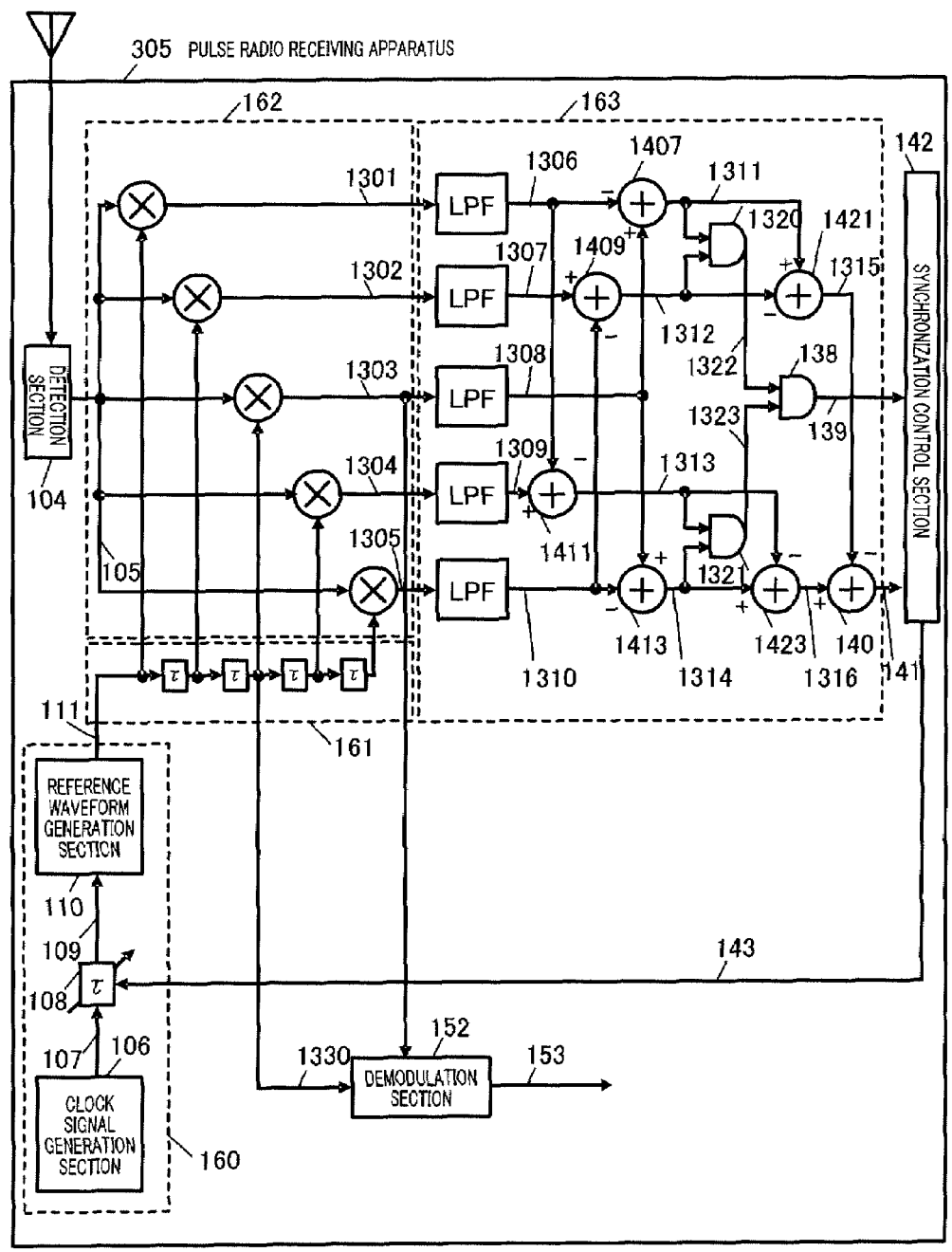
FIG. 20 shows the configuration of the pulse radio receiving apparatus according to Embodiment 2 of the present invention.

FIG. 20 shows a configuration of the pulse radio receiving apparatus according to Embodiment 2. In FIG. 20, pulse radio receiving apparatus 305 has virtually the same configuration as pulse radio receiving apparatus 100 according to Embodiment 1 shown in FIG. 2, and so differences will be described. While pulse radio receiving apparatus 100 described in Embodiment 1 is configured to determine the phase shift based on correlation value signals of four different sequences, pulse radio receiving apparatus 305 according to the present embodiment differs in the configuration of determining the phase shift based on correlation value signals of five different sequences.

(Delay Section and Correlation Calculation Section)

In FIG. 20, delay section 161 has four delay elements and outputs five signals of inputted reference waveform signal 111 and delayed waveform signals obtained by delaying reference waveform signal 111 in units of time $\tau$. Here, with the present embodiment, delay time $\tau$ in delay elements is $\tau=T/5$. However, T is the half-maximum pulse width of the detected signal described in Embodiment 1. Correlation calculation section 162 has five mixers, and mixes detected signal 105 outputted from detection section 104 with respective five signals generated by delay section 161 and generates first to fifth correlation value signals 1301, 1302, 1303, 1304 and 1305.

(Determination Section)

Then, determination section 163 generates first to fifth signals 1306, 1307, 1308, 1309 and 1310 by equalizing these first to fifth correlation value signals 1301, 1302, 1303, 1304 and 1305 in integration sections. Next, signal 1311 and signal 1312 are generated by inverting and adding first signal 1306 to third signal 1308 and by inverting and adding fifth signal 1310 to second signal 1307, respectively, and first evaluation value signal 1315 is generated by further inverting and adding signal 1312 to signal 1311. Similarly, signal 1314 and signal 1313 are generated by inverting and adding fifth signal 1310 to third signal 1308 and by inverting and adding first signal 1306 to fourth signal 1309, respectively, and second evaluation value signal 1316 is generated by further inverting and adding signal 1313 to signal 1314.

Further, difference detection signal 141 is generated by adding the signal inverting first evaluation value signal 1315 to second evaluation value signal 1316.

Further, with the present embodiment, as shown in FIG. 20, determination section 163 further has logical AND operation sections 1320 and 1321. Then, detection section 163 is configured to perform a logical AND operation between signal 1311 and signal 1312 and between signal 1313 and signal 1314, performs a logical AND operation between these results and outputs this result as pulse correlation detection section 139. This pulse correlation detection signal 139 shows whether or not the peak of the received pulse is caught in difference detection signal 141.

(Synchronization Control Section)

Then, synchronization control section 142 generates control signal 143 based on these difference detection signal 141 and pulse correlation detection signal 139. Further, difference detection signal 141 and pulse correlation detection signal 139 will be described in detail below.

Then, demodulation section 152 demodulates signal data 153 from correlation value signal 1303 showing the greatest correlation and delayed waveform signal 1330 delayed by time $2\tau$. In this case, delayed waveform signal 1330 is used as the demodulation timing signal because the amount of delay for delayed waveform signal 1330 is half the amount of delay $4\tau$ for the delayed waveform signal which is given the greatest delay by delay section 161, that is, $2\tau$, and because delayed waveform signal 1330 is a timing signal used upon generation of correlation value signal 1303.

(Description of Operation)

The operation of pulse radio receiving apparatus 305 is virtually the same as pulse radio receiving apparatus 100 according to Embodiment 1, and so differences will be described. Determination section 163 of pulse radio receiving apparatus 100 described in Embodiment 1 finds the difference between two pairs of correlation values of four correlation values shown by correlation value signals of four different sequences as shown in FIG. 10A to FIG. 10C and determines the phase shift based on the relative scales between these two pairs. By contrast with this, pulse radio receiving apparatus 305 according to Embodiment 2 finds the differences between four pairs of correlation values of five correlation values shown by correlation value signals of five different sequences and determines the phase shift based on the relative scales of the differences between these pairs.

Figure 21A:
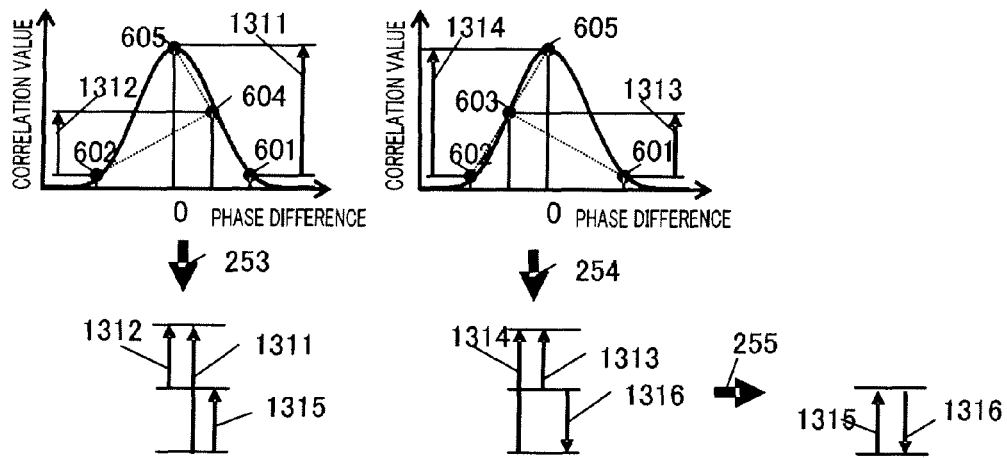
FIG. 21 illustrates the operation of the determination section according to Embodiment 2.
Figure 21B:
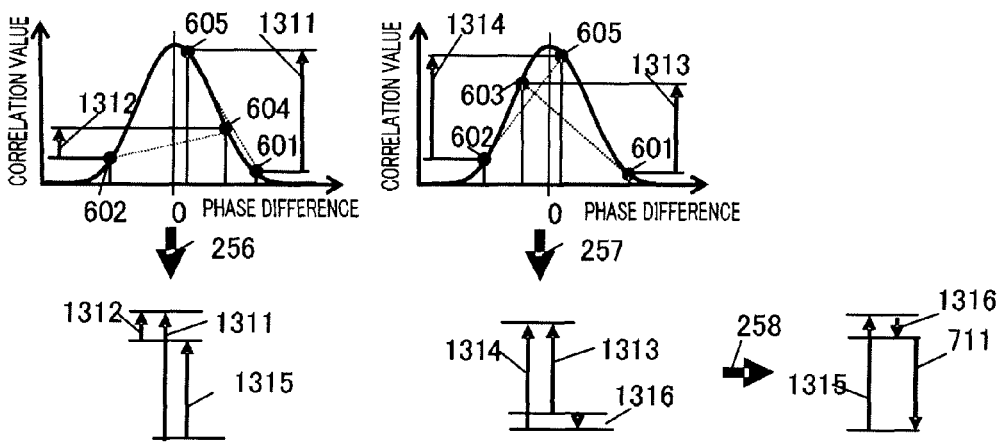
Figure 21C:
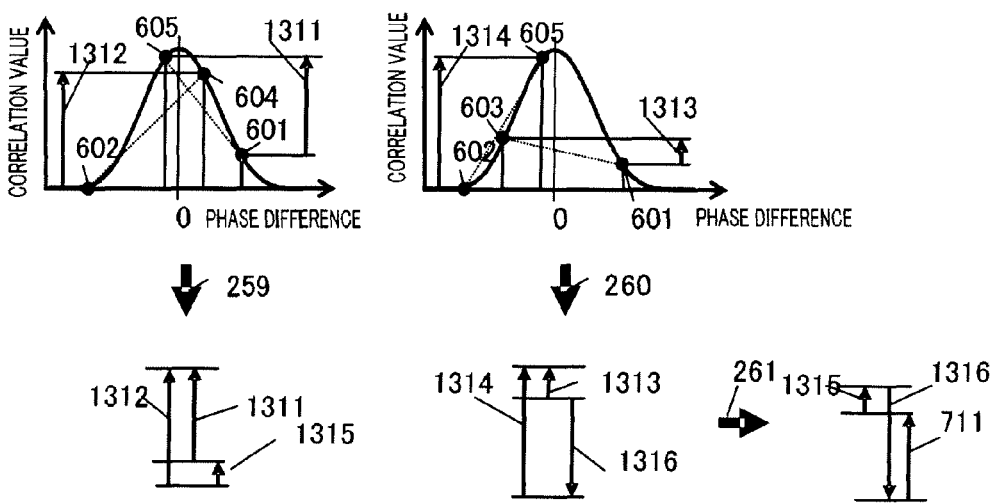

FIG. 21A to FIG. 21C illustrate the operation of the determination section according to Embodiment 2. In FIG. 21A to FIG. 21C, first, determination section 163 finds first and second evaluation values 1315 and 1316 from correlation values 601, 602, 603, 604 and 605. Next, these two evaluation values are compared to determine to what degree the synchronizing position leads as described below based on the relative scales and the difference between these two evaluation values.

FIG. 21A shows the operation of determination section 163 in the case where synchronized reception is established. Even if two evaluation values are compared (255), these values are equal and the signs are opposite, and so determination section 163 determines that there is no phase shift. In this case, determination section 163 outputs as difference detection signal 141 a signal showing that there is no phase shift between the received signal and signal sequences of the reference waveform signal and delayed waveform signals. Further, although a pattern will be described with the present embodiment where a zero level signal is outputted, a pattern is possible where no signal is outputted when there is no phase shift.

FIG. 21B shows the operation in the case where synchronized reception leads. Similarly, determination section 163 finds first and second evaluation values 1315 and 1316 (256 and 257) and furthermore compares the two evaluation values (258). As a result, determination section 163 determines that first evaluation value 1315 is greater than second evaluation value 1316 and that the synchronizing position leads by difference 711 between first evaluation value 1315 and second evaluation value 1316. In this case, determination section 163 outputs as difference detection signal 141 a signal which shows a positive value and which shows this difference 711. Further, similar to Embodiment 1, the degree of phase shift is proportional to the value of difference detection signal 141.

On the contrary, FIG. 21C shows the operation in the case where synchronized reception lags. Similarly, determination section 163 finds first and second evaluation values 1315 and 1316 (259 and 260) and furthermore compares the two evaluation values (261). As a result, determination section 163 determines that first evaluation value 1315 is less than second evaluation value 1316 and that the synchronizing position lags by difference 711 between first evaluation value 1315 and second evaluation value 1316. In this case, determination section 163 outputs as difference detection signal 141 a signal which shows a negative value and which shows this difference 711.

Further, with the present embodiment, if signals 1311, 1312, 1313 and 1314 all take positive values at the same time, determination section 163 determines that the peak of the received pulse is caught in difference detection signal 141, and, at the same time, outputs pulse correlation detection signal 139 showing that there is the state where synchronization can be established, to synchronization control section 142.

By employing this configuration, the pulse radio receiving apparatus according to the present embodiment increases the number of times for comparing correlation between the received signal and the reference waveform signal and increases the number of correlation signals, thereby determining the direction and degree of phase adjustment more correctly and further reducing the time required to establish synchronization.

(Another Configuration)

Figure 22:
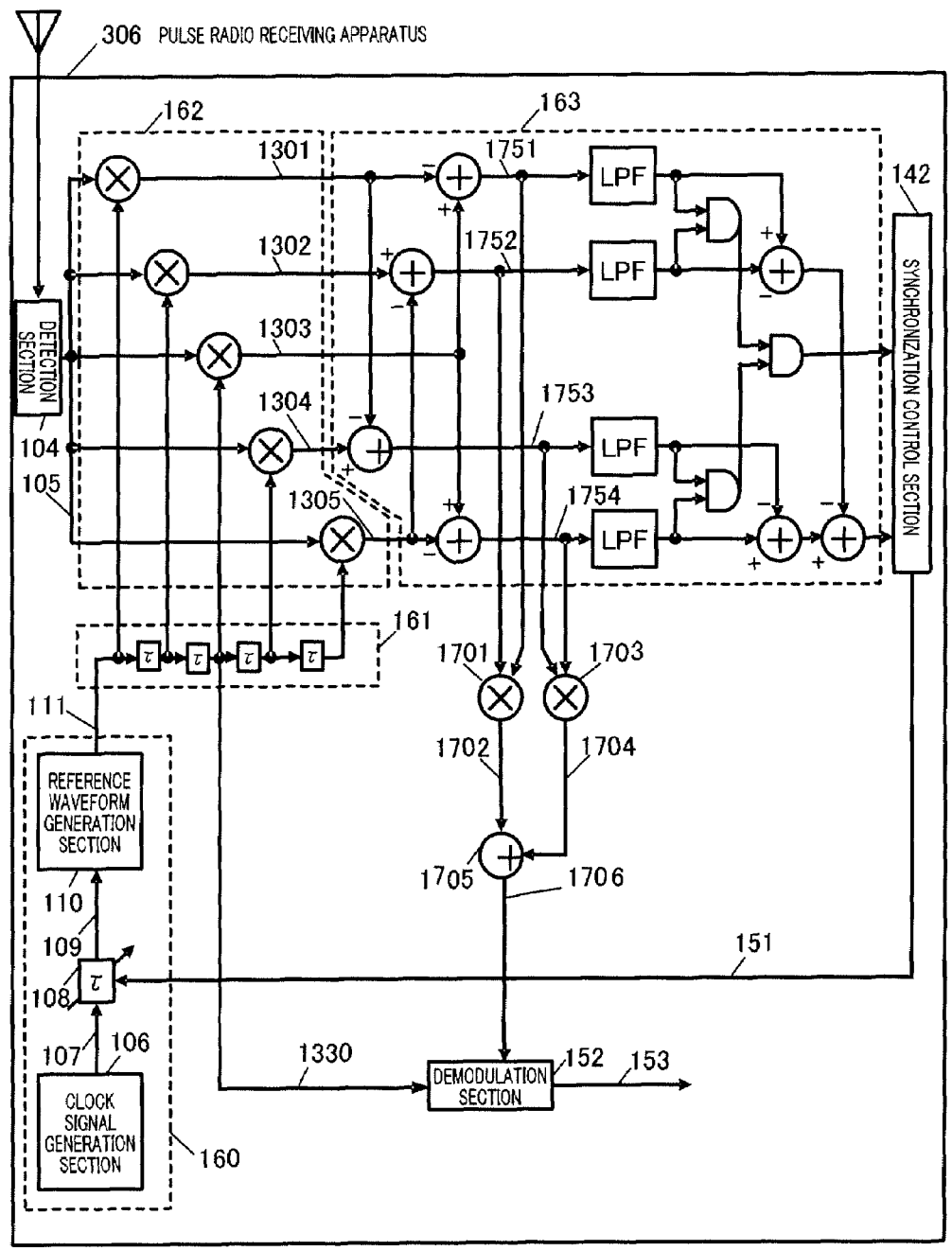
FIG. 22 shows another configuration of the pulse radio receiving apparatus according to Embodiment 2.

Further, the present embodiment employs a pattern where, as shown in FIG. 20, pulse radio receiving apparatus 305 demodulates correlation value signal 1303 showing the greatest correlation at the timing of delayed waveform signal 1330 in demodulation section 152. However, a pattern is possible where, instead of correlation value signal 1303, signals obtained by removing signals showing little correlation with the reference waveform signal from a plurality of correlation value signals are combined and demodulated. FIG. 22 shows another configuration of the pulse radio receiving apparatus according to the present embodiment. In FIG. 22, pulse radio receiving apparatus 306 generates signal 1702 by mixing at multiplier 1701 signal 1751 and 1752 obtained by combining correlation value signals and generates signal 1704 by mixing at multiplier 1703 signal 1753 and signal 1754 obtained by combining correlation value signals. Then, signal 1706 is generated by further adding these signals 1702 and signal 1704 at adder 1705 and is demodulated at a timing of delayed waveform signal 1330.

Figure 23:
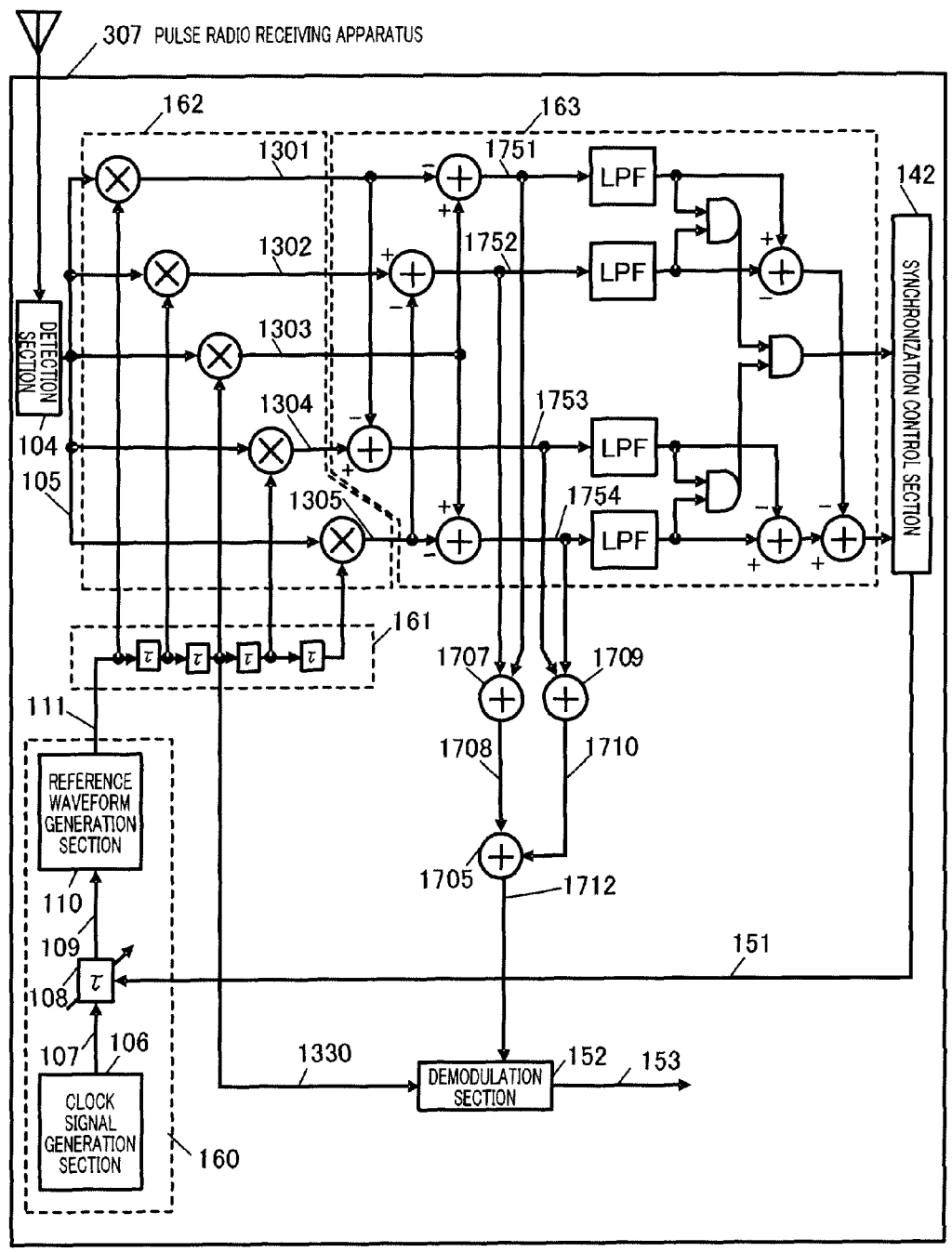
FIG. 23 shows another configuration of the pulse radio receiving apparatus according to Embodiment 2.

Further, although a pattern has been employed above where, in pulse radio receiving apparatus 306 shown in FIG. 22, when signals 1751, 1752, 1753 and 1754 are combined to obtain demodulation target signal 1706, mixing processing is carried out in multipliers 1701 and 1703, a pattern is also possible where addition processing is carried out on signals 1751, 1752, 1753 and 1754 in adders. FIG. 23 shows another configuration of the pulse radio receiving apparatus according to the present embodiment. In FIG. 23, pulse radio receiving apparatus 307 generates combined signals 1708 and 1710 using adders 1707 and 1709, generates demodulation target signal 1712 at adder 1705 and demodulates signal 1712 at the timing of delayed waveform signal 1330. Further, by generating signal 1712 for demodulation by adding signals 1708 and 1710, the shift of the signal waveform to be generated is corrected. Consequently, in a state where synchronizing positions are shifted, the demodulation error rate due to the shift of positions is lower in a pattern where signal 1712 is generated by adding signals 1708 and 1710.

Embodiment 3

Next, the pulse radio receiving apparatus according to Embodiment 3 of the present invention will be described. The pulse radio receiving apparatus according to the present embodiment decreases the number of times for comparing correlation between the received signal and the reference waveform signal and realizes reduction in the manufacturing cost and power consumption with a simpler configuration.

(Overall Configuration)

Figure 24:
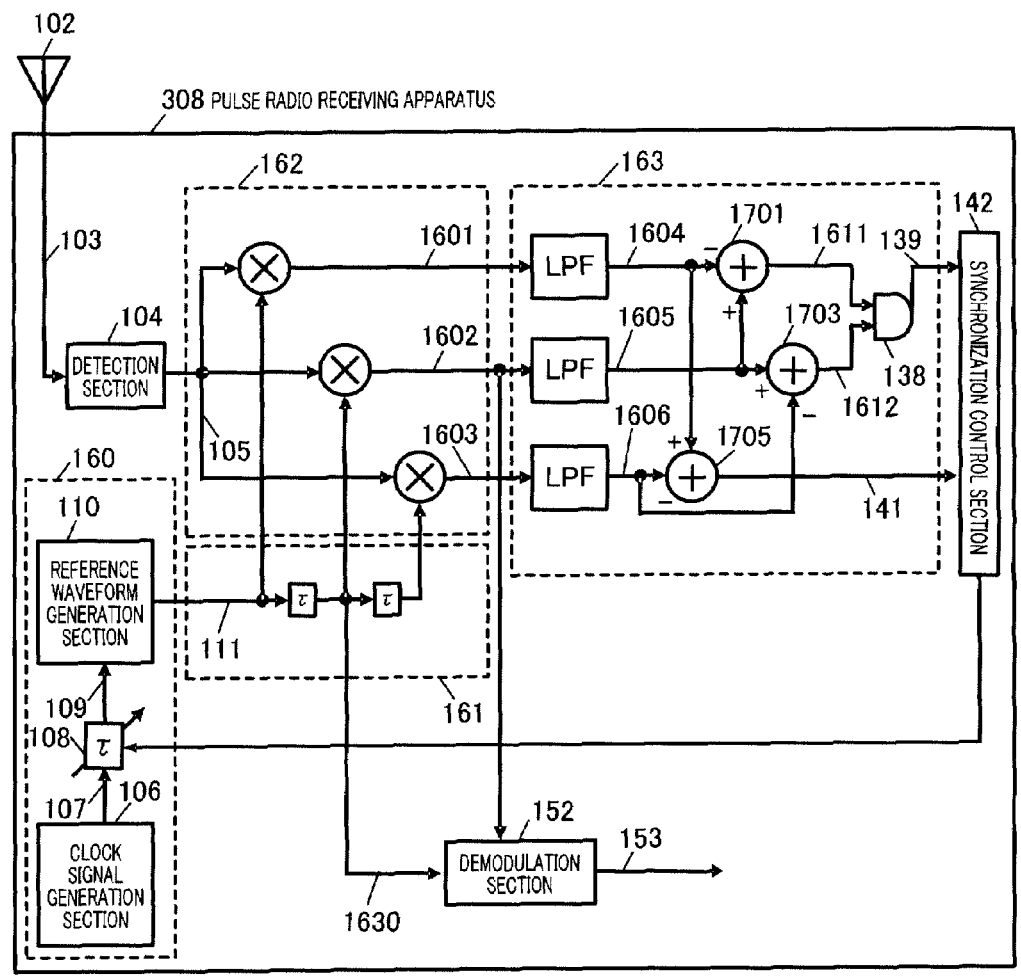
FIG. 24 shows the configuration of the pulse radio receiving apparatus according to Embodiment 3 of the present invention.

FIG. 24 shows a configuration of the pulse radio receiving apparatus according to Embodiment 3. In FIG. 24, pulse radio receiving apparatus 308 has virtually the same configuration as pulse radio receiving apparatus 100 shown in FIG. 2 according to Embodiment 1, and so differences will be described. While pulse radio receiving apparatus 100 according to Embodiment 1 is configured to determine the phase shift based on correlation value signals of four different sequences, pulse radio receiving apparatus 308 according to the present embodiment differs in the configuration of determining the phase shift based on correlation value signals of three different sequences.

(Delay Section and Correlation Calculation Section)

In FIG. 24, delay section 161 has two delay elements, and outputs three signals of inputted reference waveform signal 111 and delayed waveform signals obtained by delaying reference waveform signal 111 in units of time τ. Here, with the present embodiment, delay time τ in delay elements is τ=T/3. However, T is the half-maximum pulse width of the detected signal described in Embodiment 1. Correlation calculation section 162 has three mixers, and mixes detected signal 105 outputted from detection section 104 with respective three signals generated by delay section 161, and generates first to third correlation value signal 1601, 1602, and 1603.

(Determination Section)

Then, determination section 163 generates first to third signals 1604, 1605 and 1606 by equalizing first to third correlation value signals 1601, 1602 and 1603 in integration sections. Next, difference detection signal 141 is generated by inverting and adding third signal 1606 to first signal 1604.

Further, with the present embodiment, as shown in FIG. 24, determination section 163 is configured to, at logical AND operation section 138, perform a logical AND operation on signal 1611 obtained by inverting and adding first signal 1604 to second signal 1605 and signal 1612 obtained by inverting and adding third signal 1606 to second signal 1605, and output the result as pulse correlation detection signal 139.

This pulse correlation detection signal 139 shows whether or not the peak of the received pulse is caught in difference detection signal 141.

(Synchronization Control Section)

Then, synchronization control section 142 generates control signal 143 based on these difference detection signal 141 and pulse correlation detection signal 139. Then, demodulation section 152 demodulates signal data 153 from correlation value signal 1602 showing the greatest correlation and delayed waveform signal 1630 delayed by time τ. In this case, delayed waveform signal 1630 is used as the demodulation timing signal because the delay amount in delayed waveform signal 1630 is half the amount of delay 2τ for the delayed waveform signal which is given the greatest delay by delay section 161, that is, τ, and because delayed waveform signal 1630 is a timing signal used upon generating correlation value signal 1602.

(Description of Operation)

The operation of pulse radio receiving apparatus 308 is virtually the same as pulse radio receiving apparatus 100 according to Embodiment 1, and so differences will be described. Determination section 163 of pulse radio receiving apparatus 100 described in Embodiment 1 finds the difference between two pairs of correlation values of four correlation values shown by correlation value signals of four different sequences as shown in FIG. 10A to FIG. 10C and determines the phase shift based on the relative scales between the two pairs. In contrast with this, pulse radio receiving apparatus 308 according to Embodiment 3 finds the difference between two pairs, in which one correlation value is shared in common, in three correlation values shown by correlation value signals of three different sequences and determines the phase shift based on the relative scales of the difference between the two pairs.

Figure 25A:
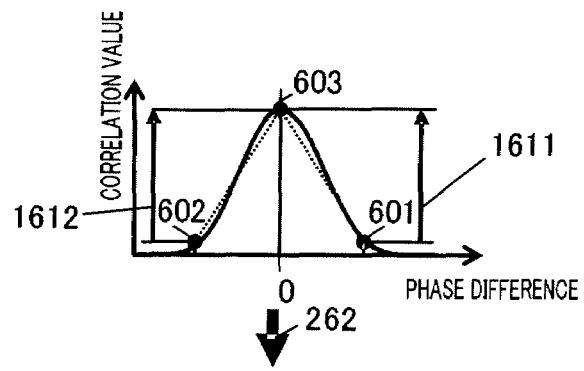
FIG. 25 illustrates the operation of the determination section according to Embodiment 3.
Figure 25B:
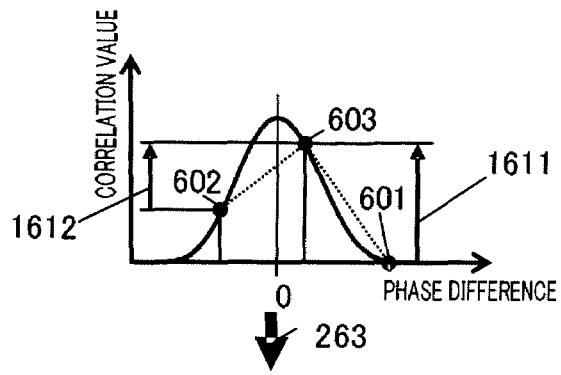
Figure 25C:
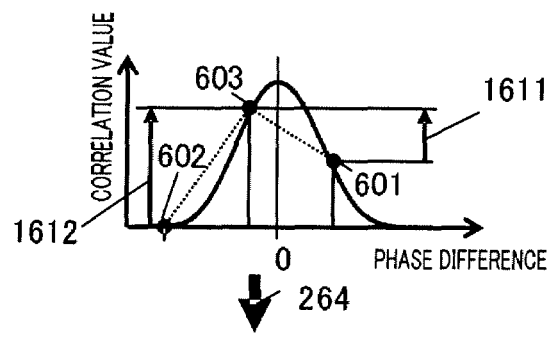

FIG. 25A to FIG. 25C illustrate the operation of the determination section according to Embodiment 3. In FIG. 25A to FIG. 25C, determination section 163 finds first and second evaluation values 1611 and 1612 from correlation values 601, 602 and 603. Next, these two evaluation values are compared to determine to what degree the synchronizing position leads as described below based on the relative scales and difference between the evaluation values.

FIG. 25A shows the operation of determination section 163 in the case where synchronized reception is established. Even if two evaluation values are compared (262), these values are equal and the signs are opposite, and so determination section 163 determines that there is no phase shift. In this case, determination section 163 outputs as difference detection signal 141 a signal showing that there is no phase shift between the received signal and signal sequences of the reference waveform signal and delayed waveform signals. Further, a pattern will be described with the present embodiment where a zero level signal is outputted, a pattern is possible where no signal is outputted when there is no phase shift.

FIG. 25B shows the operation in the case where synchronized reception leads. Similarly, determination section 163 compares first and second evaluation values 1611 and 1612 (263). As a result, determination section 163 determines that first evaluation value 1611 is greater than second evaluation value 1612 and the synchronizing position leads by difference 712 between first evaluation value 1611 and second evaluation value 1612. In this case, determination section 163 outputs as difference detection signal 141 a signal which shows a positive value and which shows this difference 712. Further, similar to Embodiment 1, the degree of phase shift is proportional to the value of difference detection signal 141.

On the contrary, FIG. 25C shows the operation in the case where synchronized reception lags. Similarly, determination section 163 compares first and second evaluation values 1315 and 1316 (264). As a result, determination section 163 determines that first evaluation value 1611 is less than second evaluation value 1612 and that the synchronizing position lags by difference 712 between first evaluation value 1611 and second evaluation value 1612. In this case, determination section 163 outputs as difference detection signal 141 a signal which shows a negative value and which shows this difference 712.

Further, with the present embodiment, if first and second evaluation values 1611 and 1612 take positive values at the same time, determination section 163 determines that the peak of the received pulse is caught in difference detection signal 141 and, at the same time, outputs pulse correlation detection signal 139 showing that there is the state where synchronization can be established, to synchronization control section 142.

Another Configuration Example

Further, in the above description using FIG. 25, when to what degree synchronizing position leads is determined, determination section 163, first, finds first and second evaluation values 1611 and 1612 and compares these two evaluation values. However, to realize this configuration, as shown in FIG. 20, a configuration is possible where difference detection signal 141 is directly generated by adding the signal inverting third signal 1606 to equalized first signal 1604.

By employing this configuration, the pulse radio receiving apparatus according to the present embodiment decreases the number of times for comparing correlation between the received signal and the reference waveform signal and reduces the manufacturing cost and power consumption with a simple the configuration.

Figure 26:
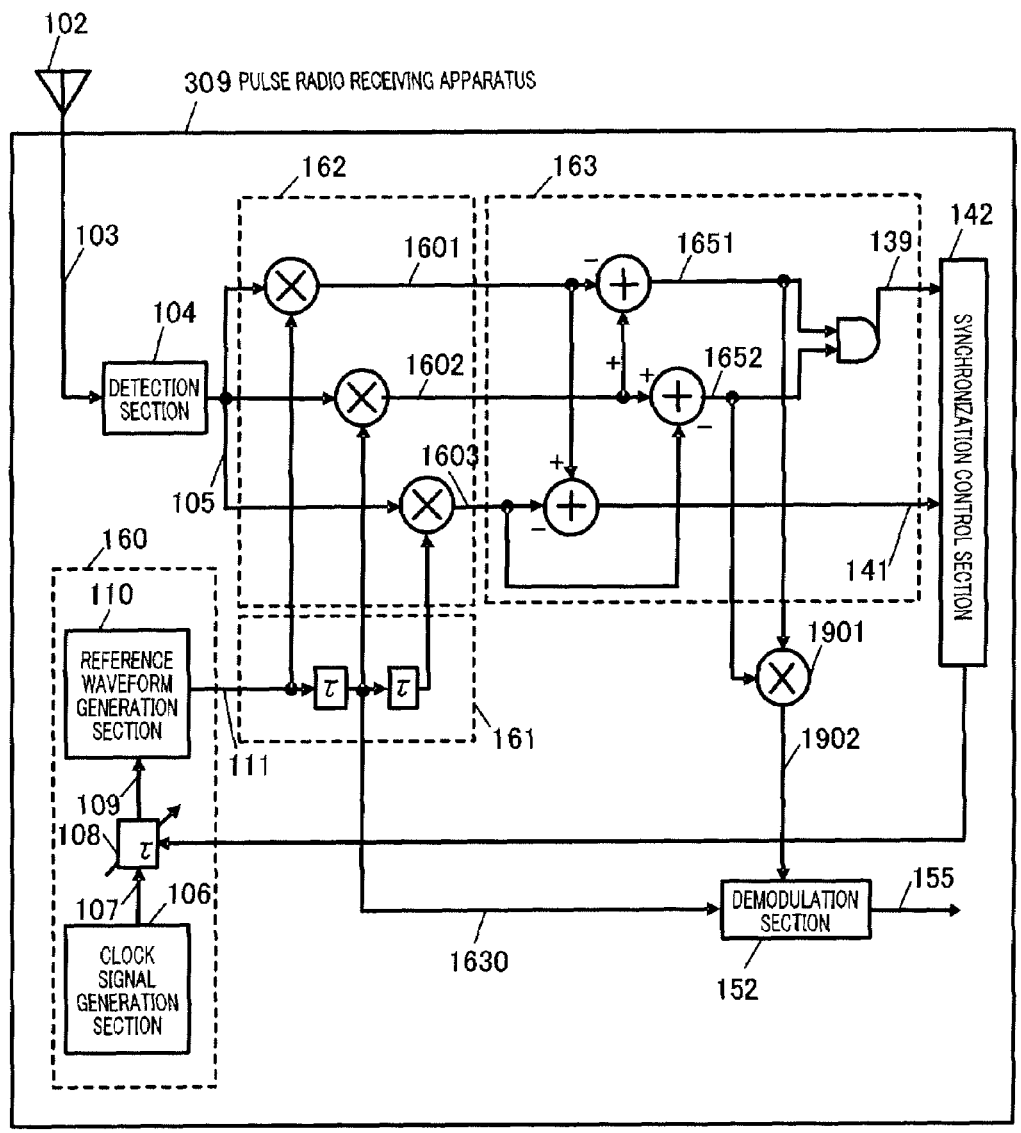
FIG. 26 shows another configuration of the pulse radio receiving apparatus according to Embodiment 3.

Further, the present embodiment employs a pattern where, as shown in FIG. 24, pulse radio receiving apparatus 308 demodulates correlation value signal 1602 showing the greatest correlation at the timing of delayed waveform signal 1630 in demodulation section 152. However, a pattern is possible where, instead of correlation value signal 1602, signals obtained by removing signals showing little correlation with the reference waveform signal from a plurality of correlation value signals are combined and demodulated. FIG. 26 shows another configuration of the pulse radio receiving apparatus according to the present embodiment. In FIG. 26, pulse radio receiving apparatus 309 generates signal 1902 by mixing at multiplier 1901 signal 1651 and 1652 obtained by combining correlation value signals and demodulates signal 1902 at the timing of delayed waveform signal 1630.

Figure 27:
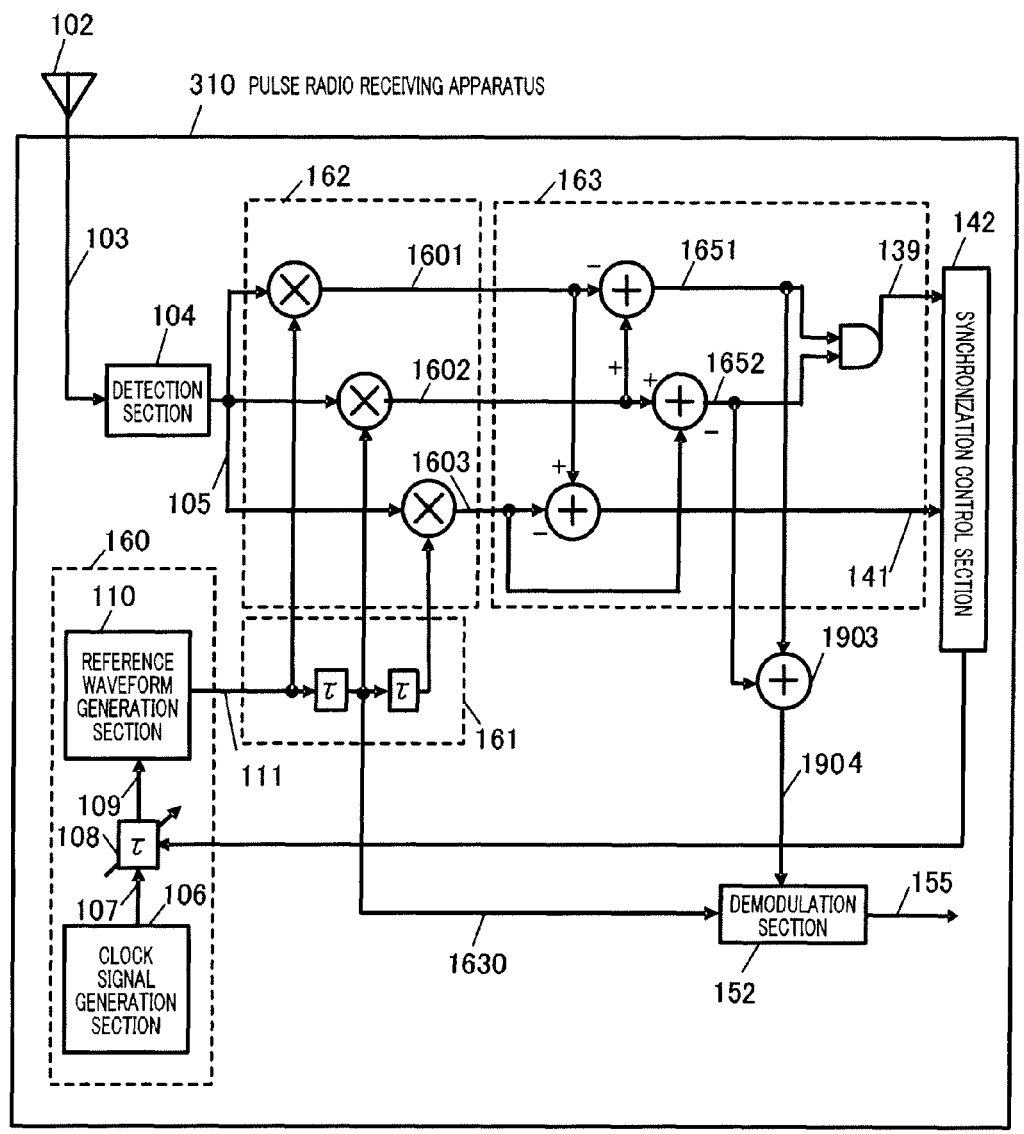
FIG. 27 shows another configuration of the pulse radio receiving apparatus according to Embodiment 3.

Further, although a pattern has been employed above where, in pulse radio receiving apparatus 306 shown in FIG. 26, when signals 1651 and 1652 are combined to obtain demodulation target signal 1902, mixing processing is carried out by multipliers 1901, a pattern is possible where addition processing is carried out on signals 1651 and 1652 by adders. FIG. 27 shows another configuration of the pulse radio receiving apparatus according to the present embodiment. In FIG. 27, pulse radio receiving apparatus 310 generates demodulation target signal 1904 in adder 1903 and demodulates signal 1904 at the timing of delayed waveform signal 1630. Further, by generating signal 1904 for demodulation by adding signals 1651 and 1652, the shift of the signal waveform to be generated is corrected. Consequently, in a state where the synchronizing positions are shifted, the demodulation error rate due to the shift of positions is lower in a pattern where signal 1904 is generated by adding signals 1651 and 1652.

The pulse receiving apparatus according to the present invention has: a detection section that detects the envelope of a received signal and generates a detected signal; a synchronizing waveform generation section that generates a reference waveform signal similar to the received signal by controlling the phase of the reference waveform signal according to an inputted control signal; a delay section that receives the reference waveform signal as the original waveform signal and generates a plurality of delayed waveform signals by delaying the original waveform signal in units of a certain amount of delay; a correlation calculation section that generates, in parallel, correlation value signals showing correlation values between the detected signal and the reference waveform signal and a plurality of delayed waveform signals; a determination section that generates a difference detection signal showing the direction and degree of phase shift between the received signal and the reference waveform signal, based on the relative scales between combinations of correlation values shown by the correlation value signals generated by the correlation calculation section; and a synchronization control section that generates, based on the difference detection signal, a control signal for controlling the phase of the reference waveform signal generated by the synchronizing waveform generation section such that the received signal synchronizes with a pulse timing and that outputs the control signal to the synchronizing waveform generation section. Consequently, by generating the correlation values between the received signal and a plurality of reference signals of different phases and making relative comparisons of the relative scales between combinations of correlation values, even when the S/N ratio of the received signal varies, the direction of phase adjustment for synchronization can be determined correctly, so that it is possible to reduce the time required to acquire an accurate synchronization timing.

Further, the pulse receiving apparatus according to the present invention has: a detection section that detects the envelope of a received signal and generates a detected signal; a synchronizing waveform generation section that generates a reference waveform signal similar to the received signal by controlling the phase of the reference waveform signal according to the inputted control signal; a delay section that receives the detected signal as the original waveform signal and generates a plurality of delayed waveform signals by delaying the original waveform signal in units of a certain amount of delay; a correlation calculation section that generates, in parallel, correlation value signals showing correlation values between the reference waveform signal and the detected waveform signal and a plurality of delayed waveform signals; a determination section that generates a difference detection signal showing the direction and degree of phase shift between the received signal and the reference waveform signal, based on the relative scales between combinations of correlation values shown by the correlation value signals generated by the correlation calculation section; and a synchronization control section that generates, based on the difference detection signal, a control signal for controlling the phase of the reference waveform signal generated by the synchronizing waveform generation section such that the received signal synchronizes with a pulse timing and that outputs the control signal to the synchronizing waveform generation section. Consequently, by generating correlation values between the reference signal and a plurality of detected received signals of different phases and making relative comparisons of the relative scales between combinations of correlation values, even when the S/N ratio of the received signal varies, the direction of phase adjustment for synchronization can be determined correctly, so that it is possible to reduce the time required to acquire an accurate synchronization timing. Further, correlation value signals can be generated by applying clock signals to the branched input ends, so that, even when significant noise is contained in the received signal, it is possible to determine the direction of phase adjustment more accurately.

Further, with the pulse radio receiving apparatus according to the present invention, the amount of delay in the delay section takes values that produces a plurality of timings in the range of the half-maximum pulse width of the detected signal. Consequently, combinations of correlation values are set so as to include adequate correlation values in the pulse width in a reliable manner and the direction of phase adjustment for synchronization can be determined more correctly, so that it is possible to reduce the time required to acquire an accurate synchronization timing.

Further, the pulse radio receiving apparatus according to the present invention further has a demodulation section that, if the detected signal is a demodulation target signal and the reference waveform signal is a timing signal, receives the demodulation target signal and the timing signal and demodulates the signal data by delaying one signal by a predetermined amount with respect to the other signal, according to the relationship between the positions of the demodulation target signal and the timing signal in a state where synchronization is established. Consequently, by determining the detected signal at the determined timing for synchronized reception, signal data can be demodulated accurately, so that it is possible to accurately demodulate signal data in a shorter time.

Further, the pulse radio receiving apparatus according to the present invention, for combinations of the correlation values used in the determination section: uses, for a first combination, a first correlation value calculated using the reference waveform signal and a third correlation value calculated using one of the plurality of delayed waveform signals other than a signal with a greatest amount of delay in the delayed waveform signals; uses, for a second combination, a second correlation value calculated using the delayed waveform signal with the greatest amount of delay and a fourth correlation value calculated using one delayed waveform signal other than a signal with a greatest amount of delay in the plurality of delayed waveform signals; and generates the difference detection signal based on a relative scale between a first evaluation value obtained by subtracting the first correlation value from the third correlation value in the first combination and a second evaluation value obtained by subtracting the second correlation value from the fourth correlation value. Consequently, using a correlation value at timings where the phase difference is maximum in the pulse, the difference between this correlation value and a correlation value at arbitrary timings in the pulse can be calculated, so that it is possible to determine the direction of phase adjustment more accurately.

Further, the pulse radio receiving apparatus according to the present invention calculates the third correlation value and the fourth correlation value using the delayed waveform signal with half an amount of delay for the delayed waveform signal with the greatest amount of delay. Consequently, using only one arbitrary timing where correlation can be obtained at least in the pulse, the direction of phase adjustment can be determined, so that the pulse radio receiving apparatus according to the present invention can be implemented in a simpler configuration.

Further, the pulse radio receiving apparatus according to the present invention: calculates the third correlation value using the delayed waveform signal with an amount of delay which is equal to or greater than and closest to half the amount of delay for the delayed waveform signal with the greatest amount of delay; and calculates the fourth correlation value using the delayed waveform signal with an amount of delay which is equal to or less than and closest to half the amount of delay for the delayed waveform signal of the greatest amount of delay. Consequently, using the timing where the correlation value is maximum, the direction of phase adjustment for synchronization can be, at least, determined more correctly, so that, even if correlation values are calculated at an even number of timings, it is possible to determine the direction of phase adjustment more accurately.

Further, the pulse radio receiving apparatus according to the present invention, for combinations of the correlation values used in the determination section: uses, for a third combination, a first correlation value calculated using the reference waveform signal and a third correlation value calculated using one of the plurality of delayed waveform signals other than a signal with a greatest amount of delay in the delayed waveform signals; uses, for a fourth combination, a second correlation value calculated using the delayed waveform signal with the greatest amount of delay and a fourth correlation value calculated using one of the plurality of delayed waveform signals other than a signal with a greatest amount of delay in the delayed waveform signals; uses, for a fifth combination, the first correlation value and a fifth correlation value calculated using one delayed waveform signal which is other than a signal with the greatest amount of delay in the plurality of delayed waveform signals and which is different from the delayed waveform signal used to calculate the third correlation value or the fourth correlation value; uses, for a sixth combination, the second correlation value and the fifth correlation value; calculates a third evaluation value by subtracting a value obtained by subtracting the first correlation value from the third correlation value in the third combination, from a value obtained by subtracting the second correlation value from the fifth correlation value in the sixth combination; calculates a fourth evaluation value by subtracting a value obtained by subtracting the second correlation value from the fourth correlation value in the fourth combination, from a value obtained by subtracting the first correlation value from the fifth correlation value in the fifth combination; and further generates the difference detection signal based on a relative scale between the third evaluation value and the fourth evaluation value. Consequently, using the correlation value at the timing where the phase difference is maximum in the pulse and the maximum correlation value, the direction of phase adjustment can be determined, so that, if correlation values are calculated at an odd number of timings, it is possible to particularly accurately determine the direction of phase adjustment.

Further, the pulse radio receiving apparatus according to the present invention: calculates the third correlation value using the delayed waveform signal with an amount of delay which is equal to or greater than and closest to half the amount of delay for the delayed waveform signal with the greatest amount of delay; calculates the fourth correlation value using the delayed waveform signal with an amount of delay which is equal to or less than and closest to half the amount of delay for the delayed waveform signal with the greatest amount of delay; and calculates the fifth correlation value using the delayed waveform signal with half an amount of delay for the delayed waveform signal with the greatest amount of delay. Consequently, the direction of phase adjustment can be determined using the closest timing to the maximum correlation value as an arbitrary timing, so that it is possible to determine the direction of phase adjustment more accurately.

Further, according to the pulse radio receiving apparatus of the present invention, the determination section generates low pass signals from correlation value signals generated by the correlation calculation section and adds and combines the low pass signals in predetermined combinations to generate a difference detection signal. Consequently, the operation frequency of the circuit for determination processing on correlation value signals can be reduced, so that it is possible to determine the direction of phase adjustment with a simple configuration.

Further, according to the pulse radio receiving apparatus of the present invention, the determination section samples and holds a maximum value of the correlation value signals in each clock cycle and further carries out discharge processing on the maximum value of the correlation value signals at a clock timing to generate low pass signals. Consequently, the maximum value in a unit time interval can be outputted accurately, so that it is possible to determine the degree of adjustment of the synchronization time more accurately.

Further, according to the pulse radio receiving apparatus of the present invention, the determination section generates a plurality of combined signals by combining the correlation value signals in the predetermined combinations, generates low pass signals from a plurality of combined signals and adds and combines the low pass signals to generate the difference detection signal. Consequently, the pulse radio receiving apparatus can be configured with fewer integration circuits, and therefore can be implemented in a simpler configuration.

Further, the pulse radio receiving apparatus according to the present invention further generates a demodulation target signal by adding or mixing the correlation value signals generated by the detection section, generates a timing signal delayed at a timing of the reference waveform signal such that the amount of delay for the timing signal is equal to the demodulation target signal, and further has a demodulation section that demodulates signal data from the demodulation target signal and the timing signal. Consequently, a signal from which an unnecessary signal, which is not correlated with the reference waveform signal, is removed, can be generated as a demodulation target signal, so that it is possible to carry out demodulation processing with fewer errors.

Further, with the pulse radio receiving apparatus according to the present invention, a predetermined amount of delay time is half the amount of time of the amount of delay for the delayed waveform signal which is given the greatest delay by the delay section. Consequently, the timing signal can be obtained directly, so that it is possible to carryout demodulation processing more accurately.

Further, according to the pulse radio receiving apparatus of the present invention further, the determination section further generates a pulse correlation detection signal showing whether or not the received pulse is caught in the synchronizing position, based on a relative scale between combinations of the correlation values shown by the correlation value signals and the synchronization control section generates a control signal from the difference detection signal according to the pulse correlation detection signal. Consequently, whether or not the difference detection signal is useful can be detected at the same time, so that it is possible to generate appropriate control signals according to the state of synchronization and determine the direction of adjustment for synchronization more correctly.

Further, with the pulse radio receiving apparatus according to the present invention, the synchronization control section generates a control signal showing that the amount of phase adjustment in one control is fixed. Consequently, even if the phase shift is significant, the phase can be adjusted in units of a certain amount, so that it is possible to prevent overshoot in synchronization adjustment.

The disclosure of Japanese Patent Application No. 2006-059151, filed on Mar. 6, 2006, and Japanese Patent Application No. 2007-48017, filed on Feb. 27, 2007, including the specifications, drawings and abstracts, are incorporated herein by reference in their entirety.

INDUSTRIAL APPLICABILITY

The pulse radio receiving apparatus according to the present invention is suitable for wireless communication devices such as UWB employing impulses.

The invention claimed is:

1. A pulse radio receiving apparatus comprising: a reference waveform generation section that generates a reference waveform signal; a delay section that generates a plurality of delayed waveform signals by delaying the reference waveform signal by different amounts of delay; a correlation calculation section that generates a plurality of correlation values comprising a correlation value between a received signal and the reference waveform signal and a correlation value between the received signal and each of the plurality of delayed waveform signals; a determination section that compares the plurality of correlation values in a combination comprising the correlation values, which are not adjacent to each other in a time domain, and generates a difference detection signal showing a direction and degree of a phase shift between the received signal and the reference waveform signal according to comparison results; and a synchronization control section that controls a phase of the reference waveform signal generated by the reference waveform generation section based on the difference detection signal, wherein, for the combination of the correlation values, the determination section is configured to: use, for a first combination, a first correlation value calculated using the reference waveform signal and a third correlation value calculated using one of the plurality of delayed waveform signals other than a delayed waveform signal with a greatest amount of delay in the delayed waveform signals; use, for a second combination, a second correlation value calculated using the delayed waveform signal with the greatest amount of delay and a fourth correlation value calculated using one delayed waveform signal other than the signal with the greatest amount of delay in the plurality of delayed waveform signals; and generate the difference detection signal based on a relative scale between a first evaluation value obtained by subtracting the first correlation value from the third correlation value in the first combination and a second evaluation value obtained by subtracting the second correlation value from the fourth correlation value.

2. The pulse radio receiving apparatus according to claim 1, wherein the delay section sets the greatest amount of delay for the delayed waveform signals to be less than a symbol length of the received signal.

3. The pulse radio receiving apparatus according to claim 2, wherein the delay section sets a delay interval between the delayed waveform signals to be equal to or less than half the symbol length of the received signal.

4. The pulse radio receiving apparatus according to claim 3, wherein the delay section generates at least three of the delayed waveform signals and sets the greatest amount of delay for the delayed waveform signals to be equal to or less than half the symbol length of the received signal.

5. The pulse radio receiving apparatus according to claim 1, wherein the delay section sets a greatest amount of delay for the delayed waveform signals to be equal to or less than a cycle of a carrier frequency of the received signal.

6. The pulse radio receiving apparatus according to claim 5, wherein the delay section sets a delay interval between the delayed waveform signals to be equal to or less than half the cycle of the carrier frequency of the received signal.

7. The pulse radio receiving apparatus according to claim 6, wherein the delay section generates at least three of the delayed waveform signals and sets the greatest amount of delay for the delayed waveform signals to be equal to or less than half the cycle of the carrier frequency of the received signal.

8. The pulse radio receiving apparatus according to claim 1, wherein the determination section suitably changes the combinations of the plurality of correlation values.

9. The pulse radio receiving apparatus according to claim 1, further comprising a demodulation section that demodulates signal data from the received signal using the reference waveform signal as a timing signal.

10. The pulse radio receiving apparatus according to claim 9, wherein the demodulation section demodulates the correlation value showing a correlation value between the received signal and the reference waveform signal.

11. The pulse radio receiving apparatus according to claim 9, further comprising a detector that detects an envelope of the received signal, wherein: the correlation value calculation section generates a plurality of correlation values showing correlation values between the received signal subjected to envelope detection by the detector and the reference waveform signal and the delayed waveform signals; the determination section generates the difference detection signal showing the direction and degree of the phase shift between the received signal subjected to envelope detection by the detector and the reference waveform signal; and the demodulation section demodulates the received signal subjected to envelope detection by the detector.

12. The pulse radio receiving apparatus according to claim 1, wherein the third correlation value and the fourth correlation value are calculated using one of the delayed waveform signals with half an amount of delay for the delayed waveform signal with the greatest amount of delay.

13. The pulse radio receiving apparatus according to claim 1, wherein:
the third correlation value is calculated using one of the delayed waveform signals with an amount of delay which is equal to or greater than and closest to half the amount of delay for the delayed waveform signal with the greatest amount of delay; and the fourth correlation value is calculated using one of the delayed waveform signals with an amount of delay which is equal to or less than and closest to half the amount of delay for the delayed waveform signal of the greatest amount of delay.

14. The pulse radio receiving apparatus according to claim 1, wherein the determination section equalizes each of the plurality of correlation values and adds and combines the equalized correlation values in the combinations to generate the difference detection signal.

15. The pulse radio receiving apparatus according to claim 14, wherein the determination section samples and holds a maximum value of the correlation values in each clock cycle and further carries out discharge processing on the maximum value of the correlation values at a clock timing to equalize each of the plurality of correlation values.

16. A pulse waveform receiving apparatus comprising: a reference waveform generation section that generates a reference waveform signal; a delay section that generates a plurality of delayed waveform signals by delaying the reference waveform signal by different amounts of delay; a correlation calculation section that generates a plurality of correlation values comprising a correlation value between a received signal and the reference waveform signal and a correlation value between the received signal and each of the plurality of delayed waveform signals; a determination section that compares the plurality of correlation values in a combination comprising the correlation values which are not adjacent to each other in a time domain, and generates a difference detection signal showing a direction and degree of a phase shift between the received signal and the reference waveform signal according to comparison results; and a synchronization control section that controls a phase of the reference waveform signal generated by the reference waveform generation section based on the difference detection signal, wherein, for combinations of the correlation values, the determination section is configured to: use, for a third combination, a first correlation value calculated using the reference waveform signal and a third correlation value calculated using one of the plurality of delayed waveform signals other than a delayed waveform signal with a greatest amount of delay in the delayed waveform signals; use, for a fourth combination, a second correlation value calculated using the delayed waveform signal with the greatest amount of delay and a fourth correlation value calculated using one of the plurality of delayed waveform signals other than the delayed waveform signal with the greatest amount of delay in the delayed waveform signals; use, for a fifth combination, the first correlation value and a fifth correlation value calculated using one delayed waveform signal which is other than the delayed waveform signal with the greatest amount of delay in the plurality of delayed waveform signals and which is different from the delayed waveform signal used to calculate the third correlation value or the fourth correlation value; uses, for a sixth combination, the second correlation value and the fifth correlation value; calculates a third evaluation value by subtracting a value obtained by subtracting the first correlation value from the third correlation value in the third combination, from a value obtained by subtracting the second correlation value from the fifth correlation value in the sixth combination; calculate a fourth evaluation value by subtracting a value obtained by subtracting the second correlation value from the fourth correlation value in the fourth combination, from a value obtained by subtracting the first correlation value from the fifth correlation value in the fifth combination; and further generates the difference detection signal based on a relative scale between the third evaluation value and the fourth evaluation value.

17. The pulse radio receiving apparatus according to claim 16, wherein:
the third correlation value is calculated using one of the delayed waveform signals with an amount of delay which is equal to or greater than and closest to half the amount of delay for the delayed waveform signal with the greatest amount of delay;
the fourth correlation value is calculated using one of the delayed waveform signals with an amount of delay which is equal to or less than and closest to half the amount of delay for the delayed waveform signal with the greatest amount of delay; and the fifth correlation value is calculated using one of the delayed waveform signals with half an amount of delay for the delayed waveform signal with the greatest amount of delay.

18. A pulse waveform receiving apparatus comprising: a reference waveform generation section that generates a reference waveform signal; a delay section that generates a plurality of delayed waveform signals by delaying the reference waveform signal by different amounts of delay; a correlation calculation section that generates a plurality of correlation values comprising a correlation value between a received signal and the reference waveform signal and a correlation value between the received signal and each of the plurality of delayed waveform signals; a determination section that compares the plurality of correlation values in a combination comprising the correlation values which are not adjacent to each other in a time domain, and generates a difference detection signal showing a direction and degree of a phase shift between the received signal and the reference waveform signal according to comparison results; and a synchronization control section that controls a phase of the reference waveform signal generated by the reference waveform generation section based on the difference detection signal, wherein the determination section generates a plurality of combined signals by combining the correlation values in the combinations, equalizes each of the combined signals and adds and combines the equalized combined signals to generate the difference detection signal, and wherein, for the combination of the correlation values, the determination section is configured to: use, for a first combination, a first correlation value calculated using the reference waveform signal and a third correlation value calculated using one of the plurality of delayed waveform signals other than a delayed waveform signal with a greatest amount of delay in the delayed waveform signals; use, for a second combination, a second correlation value calculated using the delayed waveform signal with the greatest amount of delay and a fourth correlation value calculated using one delayed waveform signal other than the signal with the greatest amount of delay in the plurality of delayed waveform signals; and generate the difference detection signal based on a relative scale between a first evaluation value obtained by subtracting the first correlation value from the third correlation value in the first combination and a second evaluation value obtained by subtracting the second correlation value from the fourth correlation value.

19. The pulse radio receiving apparatus according to claim 18, wherein:
the determination section generates the combined signals by combining the correlation values generated by the correlation calculation section, and generates a demodulation target signal by adding or mixing the combined signals generated by the determination section;
the delay section generates a timing signal by delaying the reference waveform signal by a same amount of delay as an amount of delay between the reference waveform signal and the demodulation target signal; and
the pulse radio receiving apparatus further comprises a demodulation section that demodulates signal data from the demodulation target signal and the timing signal.

20. A pulse waveform receiving apparatus comprising: a reference waveform generation section that generates a reference waveform signal; a delay section that generates a plurality of delayed waveform signals by delaying the reference waveform signal by different amounts of delay; a correlation calculation section that generates a plurality of correlation values comprising a correlation value between a received signal and the reference waveform signal and a correlation value between the received signal and each of the plurality of delayed waveform signals; a determination section that compares the plurality of correlation values in a combination comprising the correlation values which are not adjacent to each other in a time domain, and generates a difference detection signal showing a direction and degree of a phase shift between the received signal and the reference waveform signal according to comparison results; and a synchronization control section that controls a phase of the reference waveform signal generated by the reference waveform generation section based on the difference detection signal, wherein: the determination section being further configured to perform a logical AND operation that generates a pulse correlation detection signal showing whether or not the received signal is caught, based on a relative scale between combinations of the correlation values shown by the correlation values; and the synchronization control section controls a phase of the reference waveform signal according to the pulse correlation detection signal and the difference detection signal.

* * * * *